United States Patent [19]
Harazaki

[11] Patent Number: 6,137,901
[45] Date of Patent: Oct. 24, 2000

[54] PHOTOMASK PATTERN CORRECTING METHOD AND PHOTOMASK CORRECTED BY THE SAME AND PHOTOMASK PATTERN CORRECTING DEVICE

[75] Inventor: Katsuhiko Harazaki, Ikoma, Japan

[73] Assignee: Sharp Kabushiki Kaisha, Osaka, Japan

[21] Appl. No.: 09/046,564

[22] Filed: Mar. 24, 1998

[30] Foreign Application Priority Data

Mar. 24, 1997 [JP] Japan .................................. 9-090266
Mar. 17, 1998 [JP] Japan ................................. 10-067441

[51] Int. Cl.$^7$ ...................................................... G06K 9/00
[52] U.S. Cl. ................................ 382/144; 430/5; 430/30
[58] Field of Search .................................. 382/144, 145, 382/149; 430/30, 5; 348/126; 250/492.22, 492.2, 548; 356/354, 356, 363, 357, 401, 349, 372, 124

[56] References Cited

U.S. PATENT DOCUMENTS 5,682,323 10/1997 Pasch et al. ............................. 364/491
5,867,253 2/1999 Nakae ....................................... 355/52

FOREIGN PATENT DOCUMENTS 2-181909 7/1990 Japan .
2-189913 7/1990 Japan .

OTHER PUBLICATIONS

Chabala, Jan M. et al., "Extension of Graybeam Writing . . . ", Photomask Technology and Management Technical Program, Session 1, Paper 3873–05, pp. 27–29.

ETEC Technical Symposium, Jul. 27&29, 1998, Kyoto, Japan, 14 pgs.

Cobb, N. et al., Large Area Phase–Shift Mask Design, SPIE Conference in San Jose, California, Feb. 1994, pp. 1–13.

Miyama, et al, "Large–Area Optical Proximity Correction with a Combination of Rule–Based and Simulation–Based Methods", Jpn. J. Appl. Phys., vol. 35, Pt. 1, No. 128, Dec. 1996, pp. 6370–6373.

*Primary Examiner*—Bhavesh Mehta
*Attorney, Agent, or Firm*—Nixon & Vanderhye P.C.

[57] ABSTRACT

A plurality of photomask pattern data are received at a time so as to carry out, with respect to an entire region of each photomask, correction for the optical proximity effect in a photoresist. Also, from the entire region of each photomask, an underlayer correction range which requires being corrected with respect to the optical proximity effect due to a base structure of the photoresist is automatically extracted so as to correct the photoresist within only the underlayer correction range. Further, from the entire region of each photomask, a development correction range which requires being corrected with respect to receding of edges and pattern deformation of the photoresist generated during development is automatically extracted so as to correct the photoresist within only the development correction range with respect to the development of the photoresist. As a result, it is possible to accurately and rapidly correct a photomask pattern for forming of a photoresist pattern.

11 Claims, 19 Drawing Sheets

| | |
|---|---|
| 1110000000000000:111000000111000 | 0.020 |
| 1110000000000000:111000000111000 | 0.020 |
| 0111000111000001110000111000001 | 0.035 |
| 1111111100001110000000001111000 | 0.004 |
| ⋮ | ⋮ |

PHOTOMASK PATTERN CORRECTING METHOD AND PHOTOMASK CORRECTED BY THE SAME AND PHOTOMASK PATTERN CORRECTING DEVICE

FIELD OF THE INVENTION

The present invention relates to a photomask pattern correcting method for correcting a pattern of a photomask used when exposing in a lithography process which is one of the manufacturing processes of a semiconductor device, and to a photomask corrected by the same, and to a photomask pattern correcting device.

BACKGROUND OF THE INVENTION

In a lithography process, which is one of the manufacturing processes of a semiconductor device, various types of light energies such as visible light, UV light, or electron beam are projected on a target for exposure so as to transfer a desired pattern thereon.

In recent years, more refined and highly integrated semiconductor elements have been developed. In response to this, in the lithography technique, in order to achieve a minimum processing dimension of not more than 0.1 $\mu$m, a super resolution lithography technique capable of processing with a dimension substantially the same as or less than the wavelength of the exposing light has been developed for practical use.

The practical limit of a resolution of pattern exposure is determined by various factors. Of those factors, in response to refining of patterns in recent years, the optical proximity effect has been one of the main factors determining the resolution limit. The proximity effect refers to a problem which is caused by the interference effect of a radiation energy such as light between proximate patterns. Such a problem includes deformation of a transfer pattern caused by interference within a single pattern.

In the conventional lithography process, since the size of a transfer pattern is sufficiently large compared with the wavelength of exposing light, the problem of proximity effect is not caused. In the super resolution lithography technique, however, the proximity effect phenomenon is a big problem.

When the size of a transfer pattern is substantially the same as or less than the wavelength of exposing light, due to the proximity effect phenomenon and receding of edges (especially at line end) and a pattern deformation phenomenon of a photoresist during development, a difference in line-width and shape is generated between a pattern of a photomask and a pattern transferred onto the photoresist.

For this reason, in the super resolution photolithography, in order to form a photoresist having a desirable pattern, it is one of the most important techniques to accurately estimate the degree of deformation due to the optical proximity effect, etc., generated when transferring, and to correct a photomask pattern. The same can be said for the lithography technique adopting an electron beam which has a large interaction, or other types of light energies.

To present, various attempts have been made to correct a photomask pattern by accurately estimating the optical proximity effect. For example, Japanese Unexamined Patent publication No. 189913/1990 (Tokukaihei 2-189913) discloses a method of correcting a photomask pattern with respect to the optical proximity effect.

In the above publication, an improvement is made at a semiconductor element level; however, in practice, correction at a chip level, i.e., a large area of approximately several tens of millimeters square is required.

An example of correction with respect to the optical proximity effect at a chip level or at a block level is suggested in the following publication: S. Miyama, K. Yamamoto, et al., "Large area optical proximity correction with a combination of rule-based and simulation-based methods", Jpn. J. Appl. Phys. Vol. 35 (December 1996) pp. 6370–6373.

The following describes the correction steps with respect to the proximity effect carried out in the above conventional example referring to the flowchart of FIG. 13, and FIG. 14 and FIG. 15.

First, a distribution of light intensity in a projected image is determined from a pattern 30 of the photomask shown in FIG. 14, and a critical edge (transparent pattern edge or opaque pattern edge of pattern 30) subject to correction with respect to the optical proximity effect is extracted (S41 and S42). In FIG. 14, the hatched portions indicate opaque portions, and the other portions indicate transparent portions (translucent portions). Also, in FIG. 14, the critical edge is indicated by the heavy broken line E.

Then, an appropriate point for determining a correction amount of the critical edge E is set as a correction point, and a 1D (one dimensional) context of the correction point is determined (S43). Namely, a binary judgement is performed with respect to a correction point on the arrow C of FIG. 14 (for example, correction point P indicated by x in FIG. 14) so as to determine the 1D context which is bit map data representing the transparent portion and the opaque portion indicated by "0" and "1", respectively.

Thereafter, it is judged in S44 whether the 1D context thus determined coincides with any one of 1D contexts prepared beforehand in a correction table of FIG. 15. If it is judged in S44 that the 1D contexts coincide, the correction amount is determined referring to the correction table so as to correct portions of the photomask pattern requiring correction to the correction amount thus determined (S47). Note that, the broken line in FIG. 15 indicates the correction point P.

On the other hand, in the case where the determined 1D context does not coincide with any of the 1D contexts in the correction table, a correction amount appropriate for the determined 1D context is calculated by simulation (S45), and the determined 1D context and the correction amount determined in S45 are added to the correction table so as to update the correction table (S46). Then, the correction point is replaced with another correction point appropriate for determining the correction amount for the critical edge E (S43), and a correction amount is determined referring to the updated correction table so as to correct, in the same way as above, portions of the photomask pattern requiring correction to the correction amount thus determined (S47).

The sequence of S43 through S47 is repeated until correction is finished with respect to all the correction points of the edge extracted in S42 (S48), and when correction is finished with respect to all the correction points, the process is finished.

However, in the photomask pattern correcting method of the described conventional example, contrast and gradient of light intensity are determined from a distribution of light intensity in a projected image, and a critical edge is determined with respect to target pattern dimensions so as to carry out correction with respect to the optical proximity effect in the photoresist.

That is to say, in the photomask pattern correcting method of the conventional example, it is impossible to carry out, along with the correction with respect to the optical proximity effect, correction with respect to photoresist development and a difference in underlayer level by extracting a critical pattern range associated with receding of edges and pattern deformation of the photoresist generated during development, and line-width shifting, etc., of the photoresist due to the difference in underlayer level.

As a result, the photoresist pattern deviates from a desired pattern due to the receding of edges and pattern deformation of the photoresist, or the line-width shifting. In other words, the photomask pattern correcting method of the conventional example has a problem in that accurate correction cannot be carried out.

Further, in the photomask pattern correcting method of the conventional example, it is required that (1) simulation of a projected light optical image, (2) a calculation by simulation of photoresist exposure and development, and (3) a preparation of a correction table are carried out with respect to all regions requiring correction. As a result, a large amount of measurement data are required to be prepared in advance and an extremely long time is required for calculation, preventing fast correction from being carried out.

SUMMARY OF THE INVENTION

It is an object of the present invention to provide a photomask pattern correcting method and a photomask pattern correcting device respectively capable of carrying out accurate and fast correction with respect to a photomask pattern, and a photomask corrected by the same.

In order to achieve the above-mentioned object, a photomask pattern correcting method in accordance with the present invention for forming a desired photoresist pattern on a wafer by developing a photoresist after exposure through a photomask includes the steps of (1) receiving, at a time, pattern data representing patterns of a plurality of photomasks, (2) automatically extracting, from an entire region of each of the plurality of photomasks on the pattern data, a development correction range which requires being corrected with respect to receding edges (especially at line end) and pattern deformation of a photoresist generated during development, (3) correcting, with respect to development of the photoresist, the photoresist within only the development correction range, (4) automatically extracting, from the entire region of each of the plurality of photomasks on the pattern data, an underlayer correction range which requires being corrected with respect to an optical proximity effect due to a base structure of the photoresist, and (5) correcting, with respect to the base structure of the photoresist, the photoresist within only the underlayer correction range.

In the described method, correction is carried out with respect to photoresist development, along with correction with respect to a base structure of a photoresist. Thus, it is possible to accurately correct a photomask pattern with respect to both of (i) receding edges (especially at line end) and a pattern deformation phenomenon of a photoresist dependent on a photoresist and pattern density, which occur during development and (ii) the optical proximity effect due to an optical difference in underlayer level, which become problems in a pattern with processed dimensions not more than several times the wavelength of exposing light.

Further, since correction is carried out after extracting a range requiring correction, correction of a photomask pattern can be carried out efficiently, thereby realizing fast correction of a photomask pattern.

Also, the described method includes an optical proximity effect correcting step which basically carries out correction with respect to the optical proximity effect in a photoresist, thereby realizing accurate photomask pattern correction for the optical proximity effect in a photoresist.

In order to achieve the afore-mentioned object, another photomask pattern correcting method is provided in accordance with the present invention for forming a desired photoresist pattern on a wafer by exposing a photoresist by an exposing device through a photomask which has been made by a photomask drawing device. A region whose distance from an edge of the photomask is not more than a predetermined value is designated as an optical proximity effect effective range based on (1) an exposure wavelength, a numerical aperture, and a coherent factor of the exposing device and (2) a minimum feature size of the photomask drawing device so as to carry out correction with respect only to the optical proximity effect effective range.

With this method, it is possible to effectively and accurately correct a pattern shift of a photomask pattern, which becomes a problem in patterning of a fine photomask, caused physically and chemically by a phenomenon such as an edge receding phenomenon during photoresist development which is dependent on an optical proximity effect and pattern density, thus making it easier to automate the photomask pattern correction technique including the correction of the optical proximity effect.

In the above methods, it is preferable to determine a transparent pattern density in the optical proximity effect effective range, and to carry out correction for a pattern size shift during photoresist development with respect only to a region whose transparent pattern density is not less than a threshold value if the photoresist is positive type.

In this manner, the transparent pattern density of a photomask used in a certain step of a semiconductor manufacturing process is determined in the optical proximity effect effective range, and it is judged, based on a comparison between the transparent pattern density and the threshold value whether to carry out correction with respect to the pattern size shift during photoresist development. Next, correction with respect to the pattern size shift during photoresist development is carried out with respect only to a region whose transparent pattern density exceeds the threshold value. As a result, it is possible to more efficiently carry out the photomask pattern correction, and reduce the processing time.

Incidentally, when the $\gamma$ value is large, development is carried out with an amount of light which exceeds a certain amount; thus, the shape of the photoresist after development is determined substantially with the threshold value of light intensity. On the other hand, when the $\gamma$ value is small, the shape of the photoresist after development becomes dependent on the exposure amount and the slope (distribution) of the exposure amount, and a pattern shift is generated. Thus, as the $\gamma$ value becomes smaller, occurrence of pattern shift during photoresist development is increased.

In order to overcome this problem, in the above methods, it is preferable to determine the region in which correction with respect to the pattern shift during photoresist development should be carried out based on the threshold value which is determined from the $\gamma$ value representing the exposure sensitivity of the photoresist. As a result, it is possible to efficiently and accurately correct the photomask pattern regardless of the exposure sensitivity of the photoresist.

Note that, in the above methods, the predetermined value is determined by $(a\lambda/NA)+\delta$, "a" being a positive coefficient which is determined in accordance with the coherent factor of an exposing device, λ being the exposure wavelength of the exposing device, NA being the numerical aperture of the exposing device, and δ being the minimum feature size of a photomask drawing device.

In order to achieve the afore-mentioned object, a photomask in accordance with the present invention is pattern-corrected by any one of the described pattern correcting methods.

With the described methods, it is possible to provide a photomask which allows a desirable photoresist pattern to be formed on a wafer even when a pattern shift dependent on the optical proximity effect and a pattern density, such as an edge receding phenomenon, is generated during photoresist development.

In order to achieve the afore-mentioned object, a photomask pattern correcting device for forming a desired photoresist pattern on a wafer by developing a photoresist after exposure through a photomask includes (a) a pattern data input section for receiving, at a time, pattern data representing patterns of a plurality of photomasks, (b) a development correction range extracting section for automatically extracting, from an entire region of each of the plurality of photomasks on the pattern data, a development correction range which requires being corrected with respect to receding edges (especially at line end) and pattern deformation of a photoresist generated during development, (c) a development correcting section for correcting, with respect to development of the photoresist, the photoresist within only the development correction range, (d) an underlayer correction range extracting section for automatically extracting, from the entire region of each of the plurality of photomasks on the pattern data, an underlayer correction range which requires being corrected with respect to an optical proximity effect due to a base structure of the photoresist, and (e) an underlayer correcting section for correcting, with respect to the base structure of the photoresist, the photoresist within only the underlayer correction range.

In the described arrangement, correction is carried out with respect to photoresist development, along with correction with respect to a base structure of a photoresist. Thus, it is possible to accurately correct a photomask pattern with respect to both of (i) receding edges and a pattern deformation phenomenon of a photoresist dependent on a photoresist and pattern density, which occur during development and (ii) the optical proximity effect due to an optical difference in underlayer level, which become problems in a pattern with processed dimensions not more than several times the wavelength of exposing light.

Further, since correction is carried out after extracting a range requiring correction, correction of a photomask pattern can be carried out efficiently, thereby realizing fast correction of a photomask pattern.

Also, the described arrangement includes an optical proximity effect correcting section which basically carries out correction with respect to the optical proximity effect in a photoresist, thereby realizing accurate photomask pattern correction for the optical proximity effect in a photoresist.

For a fuller understanding of the nature and advantages of the invention, reference should be made to the ensuing detailed description taken in conjunction with the accompanying drawings.

DETAILED OF THE PREFERRED EMBODIMENTS

[First Embodiment]

The following will describe one embodiment of the present invention referring to FIG. 1 through FIG. 13.

Note that, in this specification, correction with respect to receding of edges and pattern deformation of a photoresist during development thereof will be referred to as photoresist edge development correction, or simply as development correction. Also, correction with respect to the optical proximity effect due to an optical difference in underlayer level (for example, aluminum wiring) on an underlayer of the photoresist will be referred to as difference in underlayer level correction. Also, correction with respect to the optical proximity effect between patterns or within a pattern of a single photoresist will be referred to simply as optical proximity effect correction.

Figure 4:
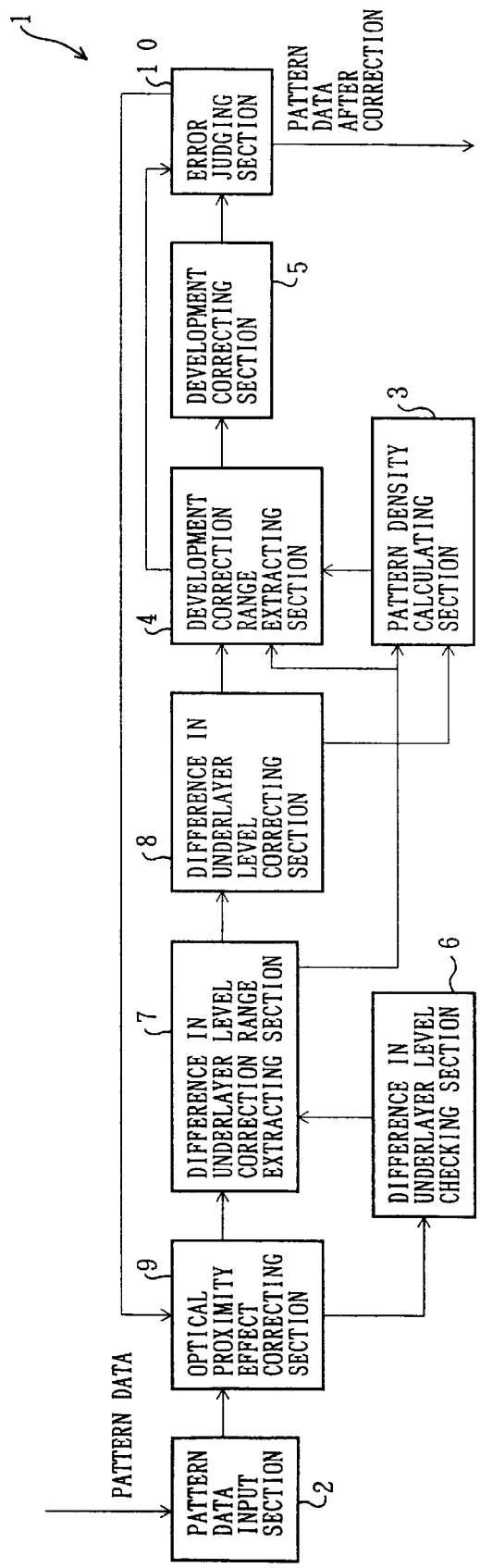
FIG. 4 is a block diagram showing one example of a photomask correction device in accordance with the present invention.

First, the following describes a photomask pattern correcting device in accordance with the present invention. As shown in FIG. 4, a pattern correction device 1 of the present invention is provided with a pattern data input section 2, a pattern data density calculating section 3, a development correction range extracting section 4, a development correcting section 5, a difference in underlayer level checking section 6, a difference in underlayer level correction range extracting section (underlayer correction range extracting section) 7, a difference in underlayer level correcting section 8, an optical proximity effect correcting section 9, and an error judging section 10.

Figure 1:
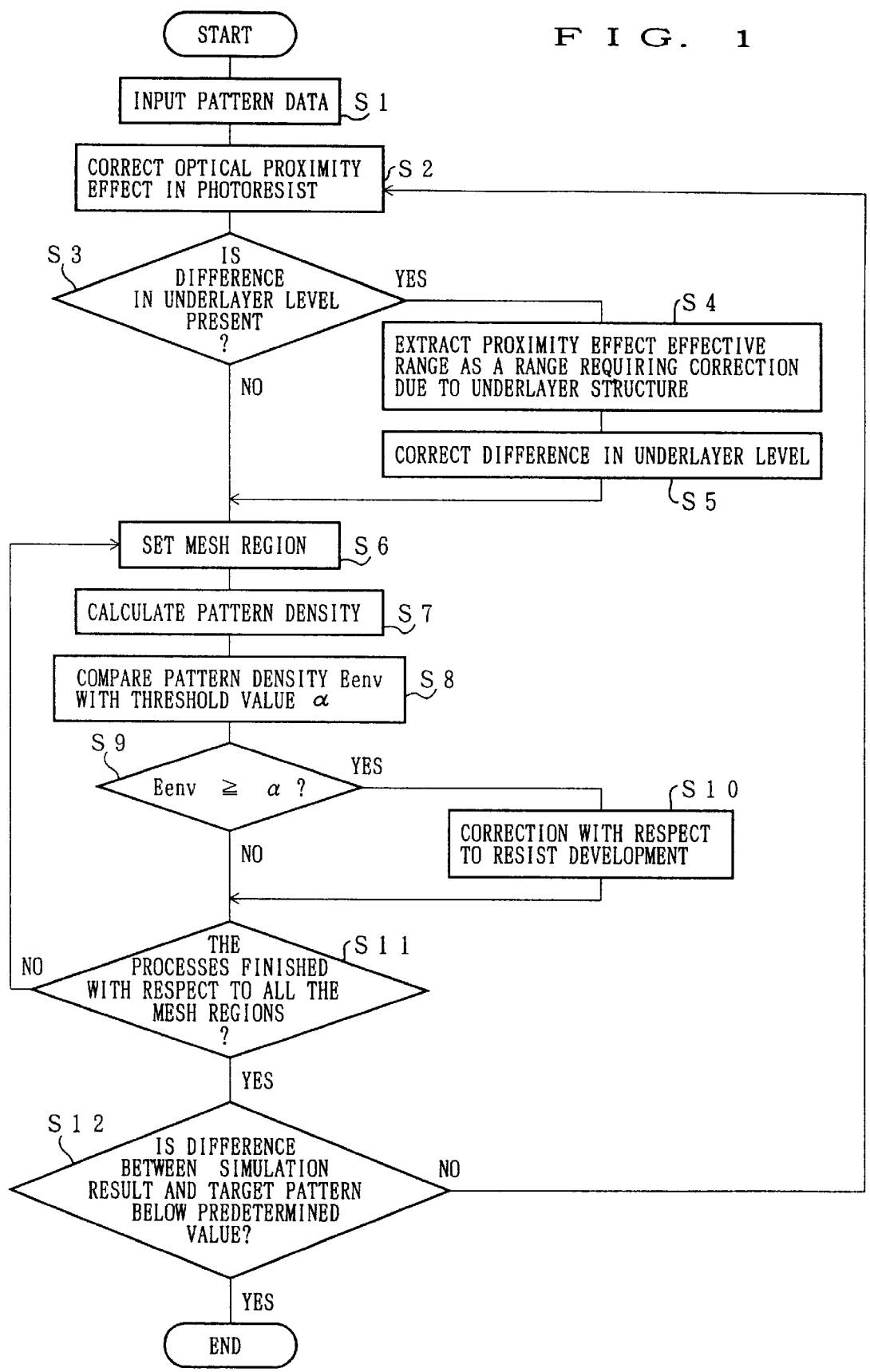
FIG. 1 is a flowchart showing one example of a photomask pattern correcting method in accordance with the present invention.
Figure 2:
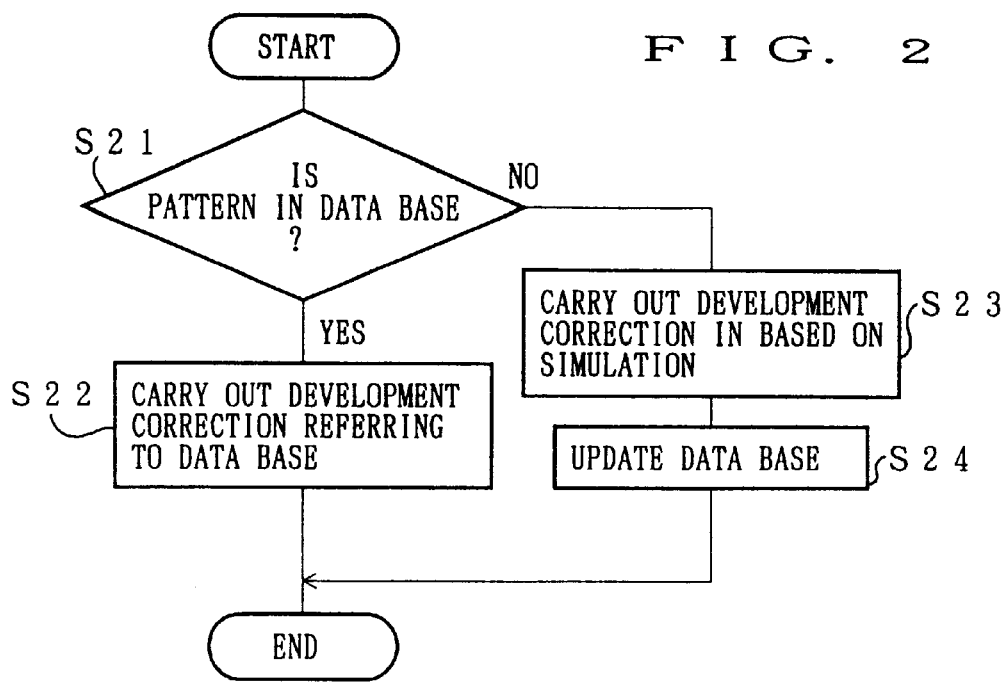
FIG. 2 is a flowchart showing a method of development correction in the photomask pattern correcting method of FIG. 1.
Figure 3:
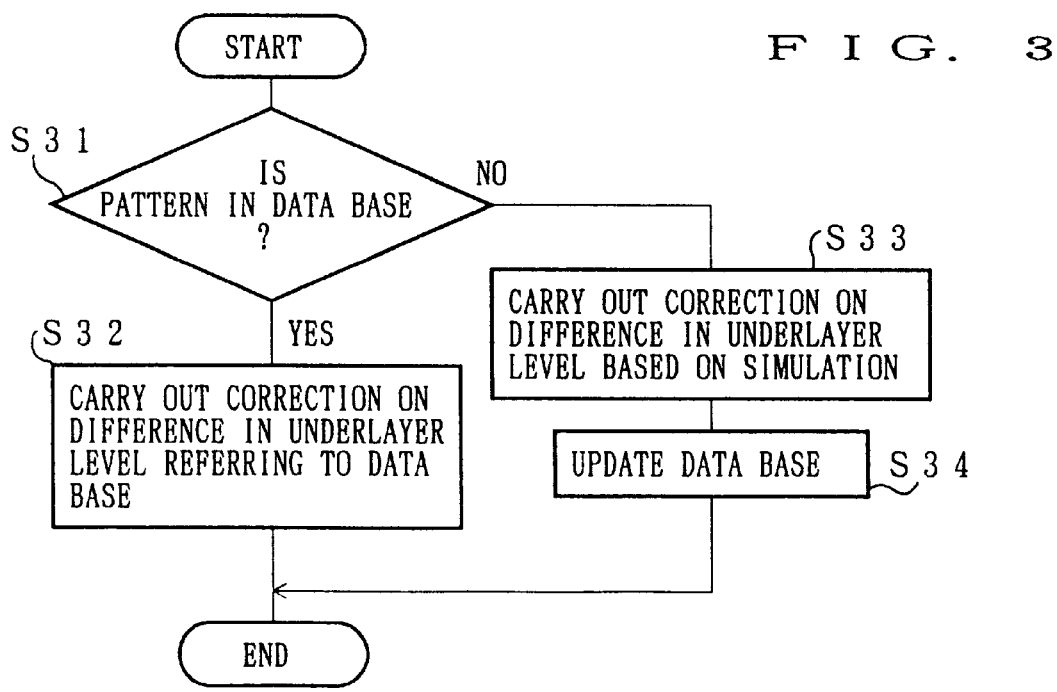
FIG. 3 is a flowchart showing a method of difference in underlayer level correction in the photomask pattern correcting method of FIG. 1.

The following describes a photomask pattern correcting method in accordance with the present invention referring to the flowcharts of FIG. 1 through FIG. 3.

In the photomask pattern correcting method of the present invention, first, all the photomask pattern data (layout data) used in a manufacturing process of a semiconductor device are inputted to the pattern data input section 2 of the pattern correction device 1 (S1).

The pattern data represent a layout of a photomask pattern corresponding to a target photoresist pattern. The pattern data also represent a pattern at a chip level or a block level. Also, the pattern data include data of a structure of LSI (Large Scale Integrated Circuit) which is an underlayer of the photoresist, for example, data of an underlayer structure indicating the material, etc.

Secondly, the pattern data inputted to the pattern data input section 2 is sent to the optical proximity effect correcting section 9. The optical proximity effect correcting section 9, upon receiving the pattern data, carries out correction of the optical proximity effect in the photoresist with respect to the pattern data (S2), and outputs the pattern data thus corrected to the difference in underlayer level checking section 6 and the difference in underlayer level correction range extracting section 7.

Thirdly, the difference in underlayer level checking section 6 checks (a) a base structure (laminated structure) of the photoresist in accordance with data of a base structure included in the inputted pattern data and (b) presence or absence of an optical difference in underlayer level (hereinafter simply referred to as difference in underlayer level) with respect to each photoresist (S3). Namely, data of a layer underlying the photoresist being formed by the current photomask, i.e., data of the structure of the underlayer of the photoresist are extracted geometrically, and it is judged whether a difference in underlayer level which causes line-width shifting of the photoresist as shown by the arrows S of FIG. 8(a) and FIG. 8(b) is present. For example, in the case where the underlayer of the photoresist is made of a material having high reflectance such as aluminum, it is judged that a difference in underlayer level is present.

Note that, FIG. 8(a) and FIG. 8(b) respectively show exposed portions 12a and non-exposed portions 12b of a positive photoresist 12 when the positive photoresist 12 having a thickness of 1.0 $\mu$m formed on an oxidation film 14 and an aluminum wire 13 having a thickness of 0.2 $\mu$m is exposed through (1) a photomask 11 composed of Cr opaque sections 11a and translucent sections 11b and (2) an air layer 15.

In FIG. 8(a) and FIG. 8(b), the width of each of the Cr opaque sections 11a is the same, and the width of the non-exposed portion 12b on the far side of the aluminum wire 13 is 0.35 $\mu$m. On the other hand, the thickness of the non-exposed portion 12b on the near side of the aluminum wire 13 is shifted from 0.35 $\mu$m to 0.30 $\mu$m due to the effect of the aluminum wire 13. That is to say, in this case, the line-width shifting of 0.05 $\mu$m is caused by the aluminum wire 13.

Fourthly, if it is judged by the difference in underlayer level checking section 6 that the difference in underlayer level is present, the difference in underlayer level correction range extracting section 7, in accordance with the result of the judgement, extracts, as a range requiring the difference in underlayer level correction, a proximity effect effective range due to the difference in underlayer level, from the entire region of each photomask in the pattern data (S4). On the other hand, if it is judged by the difference in underlayer level checking section 6 that the difference in underlayer level is absent, the difference in underlayer level correction range extracting section 7 directly sends the pattern data to the pattern data density calculating section 3 and the development correction range extracting section 4 without carrying out the difference in underlayer level correction.

The proximity effect effective range due to step-difference is determined to be a range whose distance from the optical step-difference is not more than a predetermined value, for example, a range whose horizontal pattern distance from the optical difference in underlayer level is not more than $2\lambda/NA$. In the arrangement of FIG. 8(a) and FIG. 8(b), the position pointed by the arrow S in FIG. 8(a) is where the proximity effect due to step-difference is maximum, and the range indicated by the broken line B in FIG. 8(a) and FIG. 8(b) is where the proximity effect due to step-difference is prominent.

Fifthly, the difference in underlayer level correcting section 8, by rule or simulation, determines a correction amount (shift amount) of photomask dimensions in the proximity effect effective range due to a proximate step-difference, in accordance with difference in underlayer level data in the vicinity which have been prepared beforehand. The difference in underlayer level correcting section 8 then carries out difference in underlayer level correction with respect only to the proximity effect effective range to the correction amount thus determined (S5), and sends the processed pattern data to the pattern data density calculating section 3 and the development correction range extracting section 4.

In the difference in underlayer level correction, distortion in the pattern shape is fed back to the pattern data of the photomask for the correction. The distortion in the pattern shape generated as a ray of light is projected differently, due to the difference in underlayer level, on the edge of the photoresist pattern in a vicinity of a difference in underlayer level and a portion of the photoresist pattern where there is no difference in underlayer level.

Figure 9:
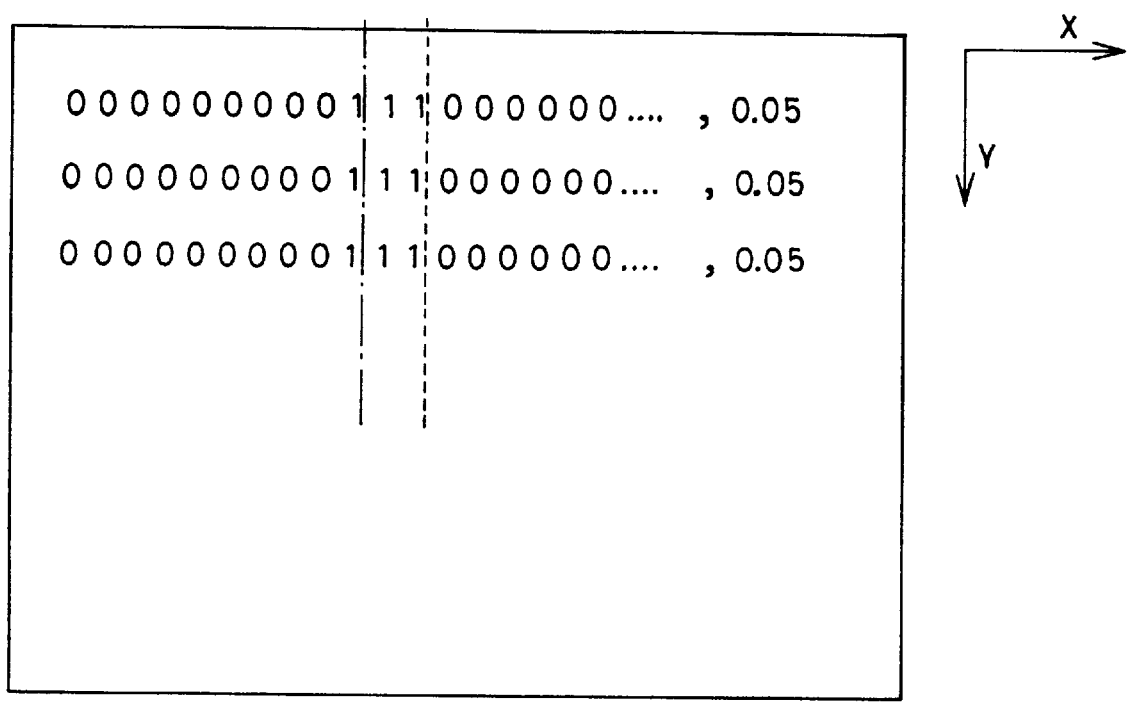
FIG. 9 is an explanatory drawing showing one example of a data base for line-width correction with respect to a difference in underlayer level.

For example, the difference in underlayer level correction is carried out in the following manner. The optical proximity effect of a layer (underlayer, mainly) different from the current layer is estimated in advance, and a data base (table) representing a relation between (1) data indicative of patterns and (2) the correction amount for a difference in underlayer level is prepared. FIG. 9 shows one example of the contents of such a data base.

In FIG. 9, the strings of zeros and ones on the left side are data representing ranges requiring the difference in underlayer level correction. In each string, "0" indicates a position on the X-Y coordinates not requiring the difference in underlayer level correction, and "1" indicates a position on the X-Y coordinates requiring the difference in underlayer level correction. Also, in FIG. 9, the numerical values (0.05) on the right side indicate a line-width shift amount (unit is μm).

In the difference in underlayer level correction, first, it is judged in S31 whether the pattern data of each photomask are entered (as one of the items of an entry) in the data base. If it is judged in S31 that the pattern data are in the data base, the difference in underlayer level correction is carried out in accordance with the data base (S32). On the other hand, if it is judged in S31 that the pattern data are not in the data base, the difference in underlayer level correction based on exposure simulation is carried out considering the difference in underlayer level (S33), and in S34, the data base is updated in accordance with the result of the simulation (S34).

Then, the pattern density calculating section 3 divides each transparent pattern (or opaque pattern) of the entire region of each photomask (each layer) in the inputted pattern data into a large number of mesh regions of rectangular or triangular shapes, and one of the mesh regions is selected (S6), and in S7, the density of transparent patterns (or opaque patterns) around the mesh region thus selected is calculated.

It is preferable that the mesh region has an area of not more than $(k\lambda/4NA)^2$. Here, k is a parameter which is set to, for example, 0.5 to 0.7 in a certain process. λ is a wavelength of exposing light, and NA represents the value of numerical aperture which is, for example, 0.5 to 0.6 in a certain semiconductor device.

Figure 5:
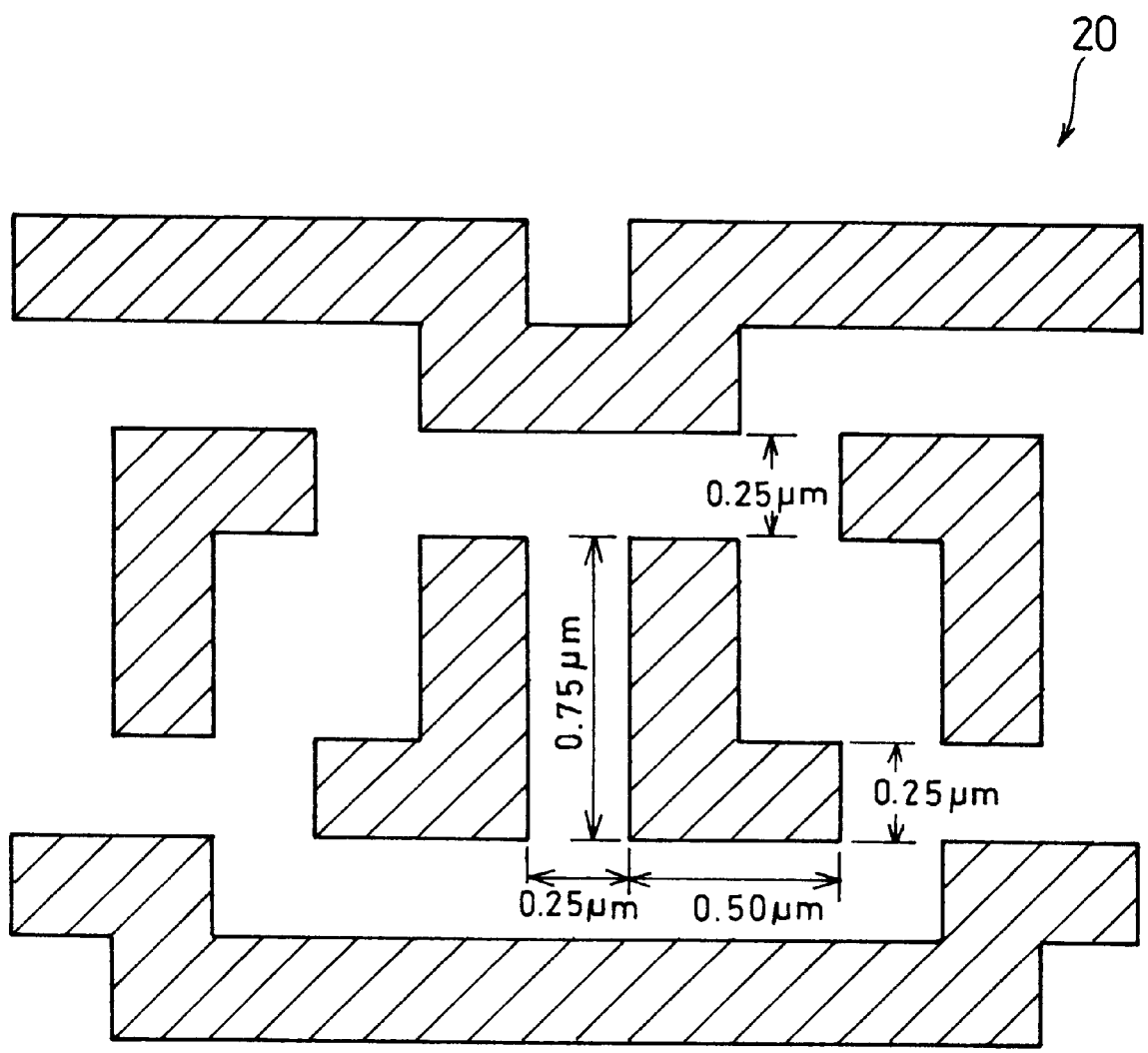
FIG. 5 is a drawing showing a photomask pattern corresponding to a target photoresist pattern.

In the case of forming a target pattern 20 of gate-polysilicon of an SRAM (Static Random Access Memory) having a line-width of 0.25 μm in a shape shown in FIG. 5 (in the case of removing the photoresist of the opaque portion), it is required to irradiate the target pattern 20 of the photoresist. Thus, in this case, the pattern density calculating section 3 divides a transparent pattern 20 of the photomask into square mesh regions, each of which is 0.0625 by 0.0625 μm square. Note that, FIG. 5 is a drawing showing the transparent pattern 20 of a photomask, before being subjected to correction, corresponding to the target pattern 20 of the photoresist.

In the pattern density calculating section 3, the calculation of transparent pattern density Eenv of the transparent mesh regions is carried out by Equation (1).

$$Eenv = Ds \sum \Omega \frac{i(x^*, y^*)\Delta(x, y)}{r(x - x^*, y - y^*)} \quad (1)$$

In Equation (1), Ω represents a transparent pattern density calculation range, $i(x^*, y^*)$ represents the value of light intensity on an arbitrary mesh region $(x^*, y^*)$ in the transparent pattern density calculation range Ω, Ds represents the total amount of exposure on the transparent pattern density calculation range Ω, $\Delta(x, y)$ represents the area of the transparent mesh region (x, y), and $r(x-x^*, y-y^*)$ represents a distance between the transparent mesh region (x, y) and the mesh region $(x^*, y^*)$. Also, the transparent pattern density calculation range Ω is set to a range within a predetermined distance from the transparent mesh region (x, y).

Note that, although it is also possible to use Equation (2) instead of Equation (1) to determine the transparent pattern density Eenv of the transparent mesh regions, Equation (1) is preferable.

$$Eenv = Ds \Sigma \Omega i(x^*, y^*) \Delta(x, y) Erf(x-x^*, y-y^*) \quad (2)$$

In Equation (2), Ω represents a transparent pattern density calculation range, $i(x^*, y^*)$ represents the value of light intensity on an arbitrary mesh region $(x^*, y^*)$ in the transparent pattern density calculation range Ω obtained from the simulation result of a projected optical image, Ds represents the total amount of exposure on the transparent pattern density calculation range Ω, and $\Delta(x, y)$ represents the area of the transparent mesh region (x, y). In Equation (2), Erf $(x-x^*, y-y^*)$ is an error function which is represented by Equation (3).

$$Erf(x-x^*, y-y^*) = Erf(r) = \int_r^\infty e^{-t^2} dt \quad (3)$$

In Equation (3), r is a distance between the transparent mesh region (x, y) and the mesh region $(x^*, y^*)$, which is represented by Equation (4).

$$r = \sqrt{(x-x^*)^2 + (y-y^*)^2} \quad (4)$$

The transparent pattern density Eenv of the transparent mesh region calculated in the pattern density calculating section 3 is inputted, together with the pattern data, to the development correction range extracting section 4. The development correction range extracting section 4 compares in S8 (a) the transparent pattern density Eenv with (b) the threshold value α which is dependent on a sensitivity characteristic obtained from resist exposure and which has been set beforehand, and it is judged in S9 whether the result of the comparison satisfies Equation (5).

$$Eenv \geq \alpha \quad (5)$$

Note that, the threshold value α is not given a specific value, but is set to an appropriate value in accordance with the photomask pattern, the exposure sensitivity characteristic of the photoresist, or processing itself. In practice, the threshold value a is changed stepwise so as to adjust the determination level for receding of photoresist edges and pattern deformation which occur during development.

In the case where the transparent pattern density Eenv of the transparent mesh region satisfies Equation (5), the development correction range extracting section 4 judges that the transparent mesh region is a development correction range requiring photoresist edge development correction, and inputs the transparent mesh region to the development correcting section 5.

A region which requires the photoresist edge development correction includes edges and corners of a line (opaque portion), edges of a space (translucent portion), and a contact, etc., in a single layer. In the positive photoresist, regions on line edges whose Eenv is not less than the threshold value α, for example, edges of a pattern, are judged as a development correction range, because such regions have high exposure density due to the pattern, and the amount of line-width shifting during development is prominent in such regions.

Figure 7:
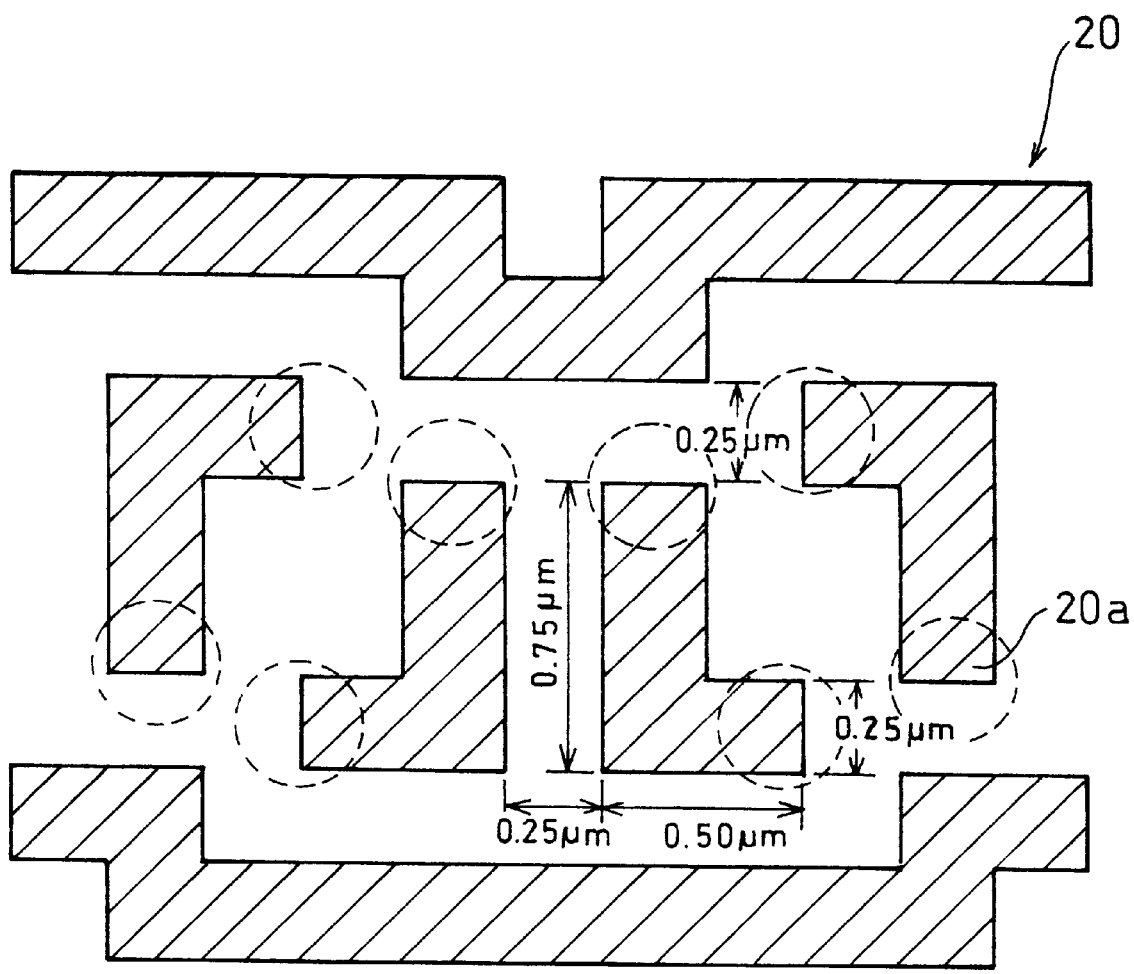
FIG. 7 is a drawing showing development correction ranges of the photomask of FIG. 5.
Figure 8:
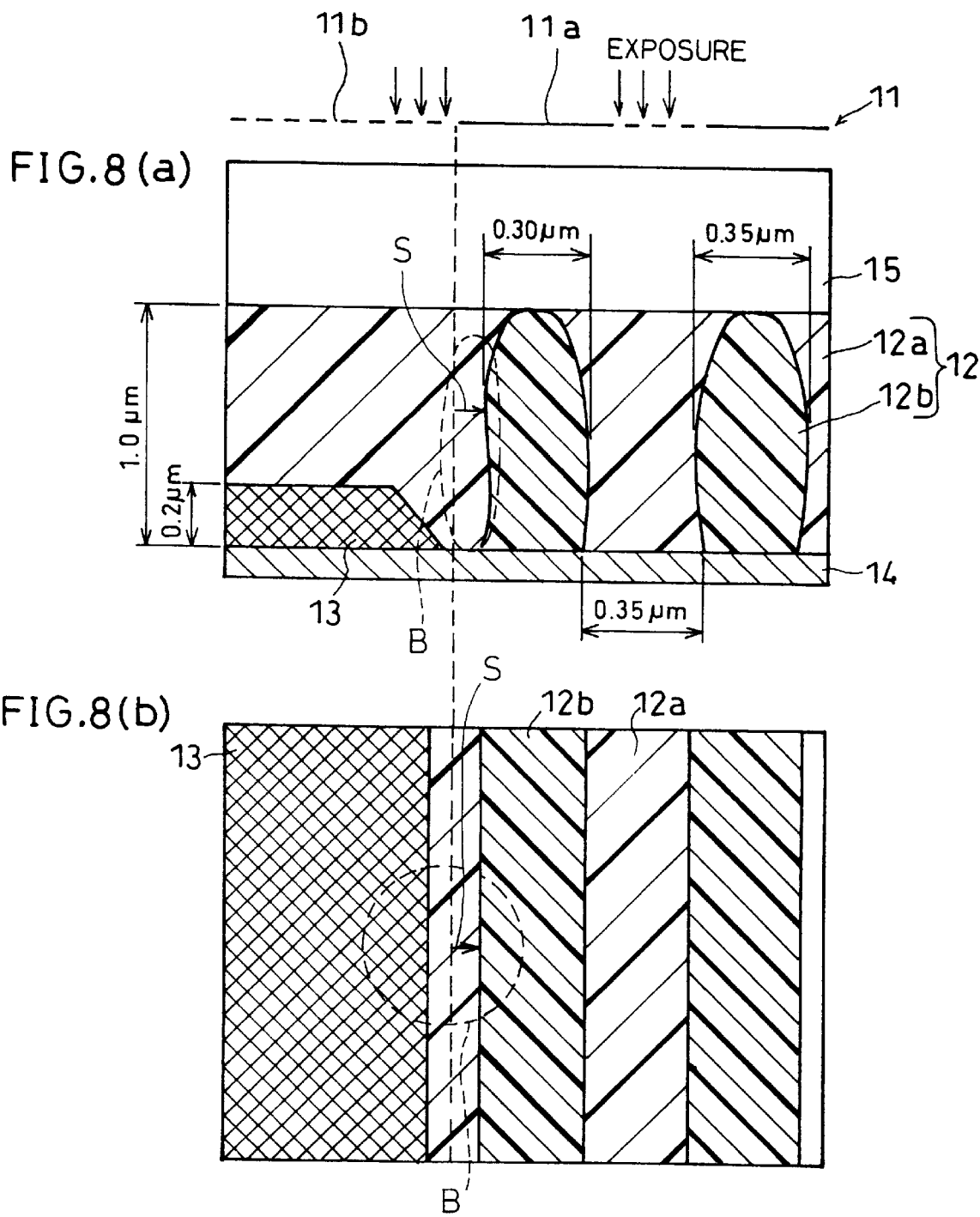
FIG. 8($a$) and FIG. 8($b$) are explanatory drawings respectively showing a proximity effect effective range due to a difference in underlayer level of a photoresist, and FIG. 8($a$) and FIG. 8($b$) are a cross sectional view and a plan view thereof, respectively.

For example, in the target pattern 20 of FIG. 5 (in the case of keeping the exposed portions of the photoresist from being removed), L-shaped long side edges 20a of the gate-polysilicon, which are enclosed by the broken circles in FIG. 7 are judged as a development correction range.

Then, in the development correcting section 5, the transparent mesh region is subjected to the photoresist edge development correction using a data base (template) obtained from simulation or measured value of the photoresist exposure and development (S10). Thereafter, the transparent mesh region is changed to a corrected transparent mesh region in S6, and the sequence returns to S7.

Specifically, the photoresist edge development correction is carried out, for example, in the manner shown in FIG. 2. Namely, a data base representing a relation between the pattern and an optimum correction amount is prepared beforehand from simulation or measured value of the photoresist exposure and development.

In the photoresist edge development correction, first, it is judged in S21 whether the pattern data of each photomask are in the data base. If it is judged in S21 that the pattern data are in the data base, the development correction is carried out in S22 referring to the data base. On the other hand, if it is judged in S21 that the pattern data are not in the data base, the development correction is carried out in S23 based on simulation, and in S24, the data base is updated in accordance with the result of the simulation. Here, in order to add data to the data base, not only the intensity of light but the simulation result or measured data of the photoresist exposure and development is required.

On the other hand, in the case where the transparent pattern density Eenv of the transparent mesh region does not satisfy Equation (5), the development correction range extracting section 4 judges that the transparent mesh region does not require the photoresist edge development correction, and sends the pattern data to the error judging section 10, and also changes the transparent mesh region to a corrected transparent mesh region in S6, and the sequence returns to S7.

The sequence of S6 to S10 is repeated until all the transparent mesh regions are processed (S11), and the processed pattern data are sent to the error judging section 10.

In the described manner, in the development correction range extracting section 4, a range requiring the photoresist edge development correction in accordance with the transparent pattern density is extracted, and the photoresist edge development correction is carried out with respect only to the development correction range.

The error judging section 10 judges whether the difference between the inputted pattern data and the simulation result is below a predetermined value, for example, five percent (S12), and if the difference is below the predetermined value, the error judging section 10 outputs the corrected pattern data, and the correction is finished. On the other hand, if the difference is less than the predetermined value, the error judging section 10 sends the pattern data again to the optical proximity effect correcting section 9, and the sequence returns to S2. After the sequence of S2 to S11 is repeated until the difference is below the predetermined value, the corrected pattern data are outputted, and the correction is finished.

Figure 10:
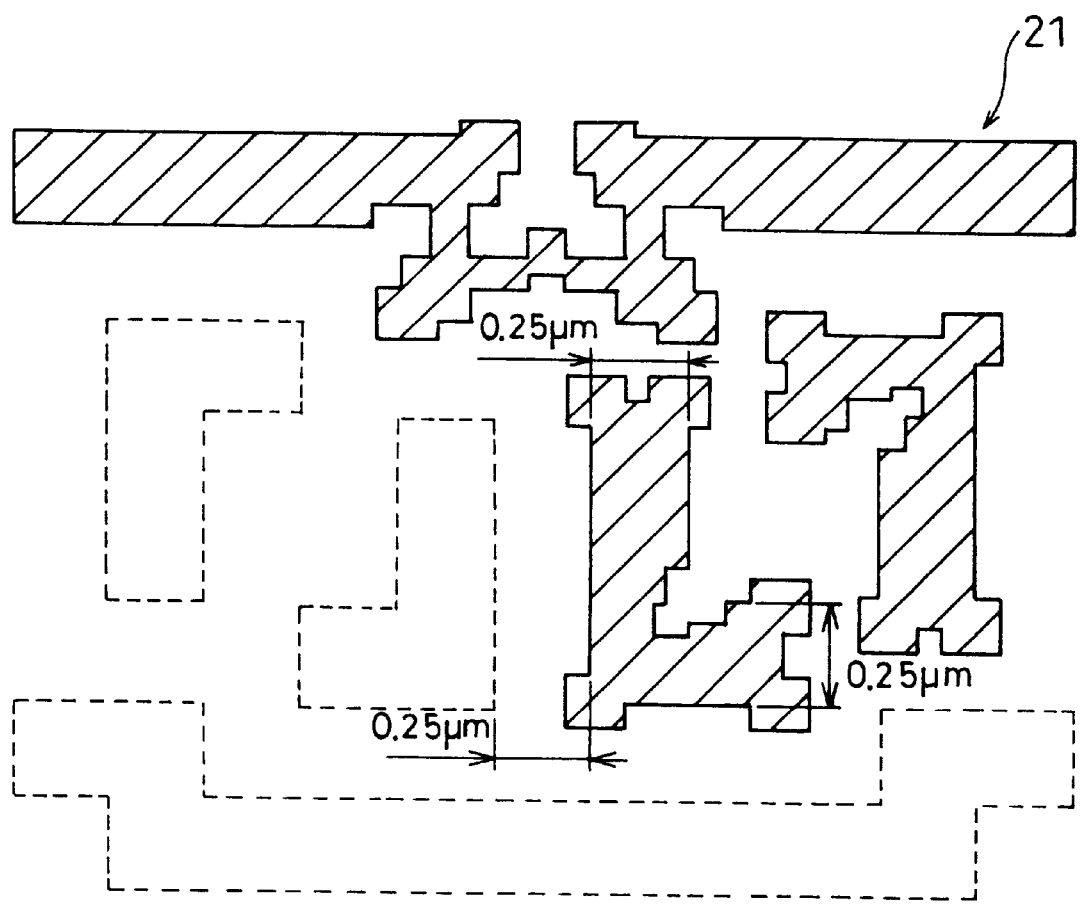
FIG. 10 is a drawing showing one example of a photomask pattern which has been corrected by the photomask pattern correcting method of the present invention.
Figure 11:
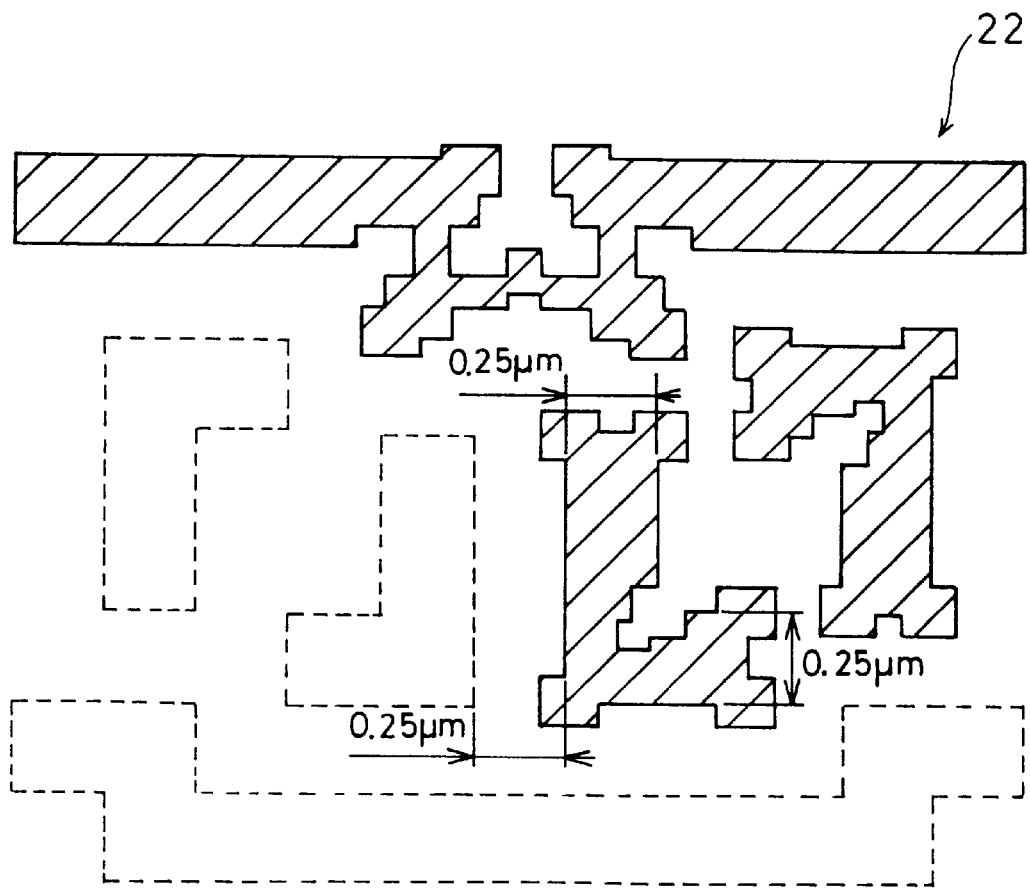
FIG. 11 is a drawing showing one example of a photomask pattern which has been corrected in accordance only with a projected optical image.

In the case where the pattern data representing the pattern of FIG. 7 is corrected in the pattern correction device 1, the transparent pattern of the outputted pattern data (result of correction) takes a shape of, for example, a pattern 21 as indicated by the solid lines of FIG. 10. Also, for comparison, a pattern 22, which is an example of a corrected pattern (result of correction) obtained only from the projected optical image, is indicated by the solid lines in FIG. 11. Note that, in FIG. 10 and FIG. 11, the hatched portions respectively indicate transparent portions of the photomask, and the broken lines respectively indicate the original pattern 20 shown in FIG. 20.

Figure 12:
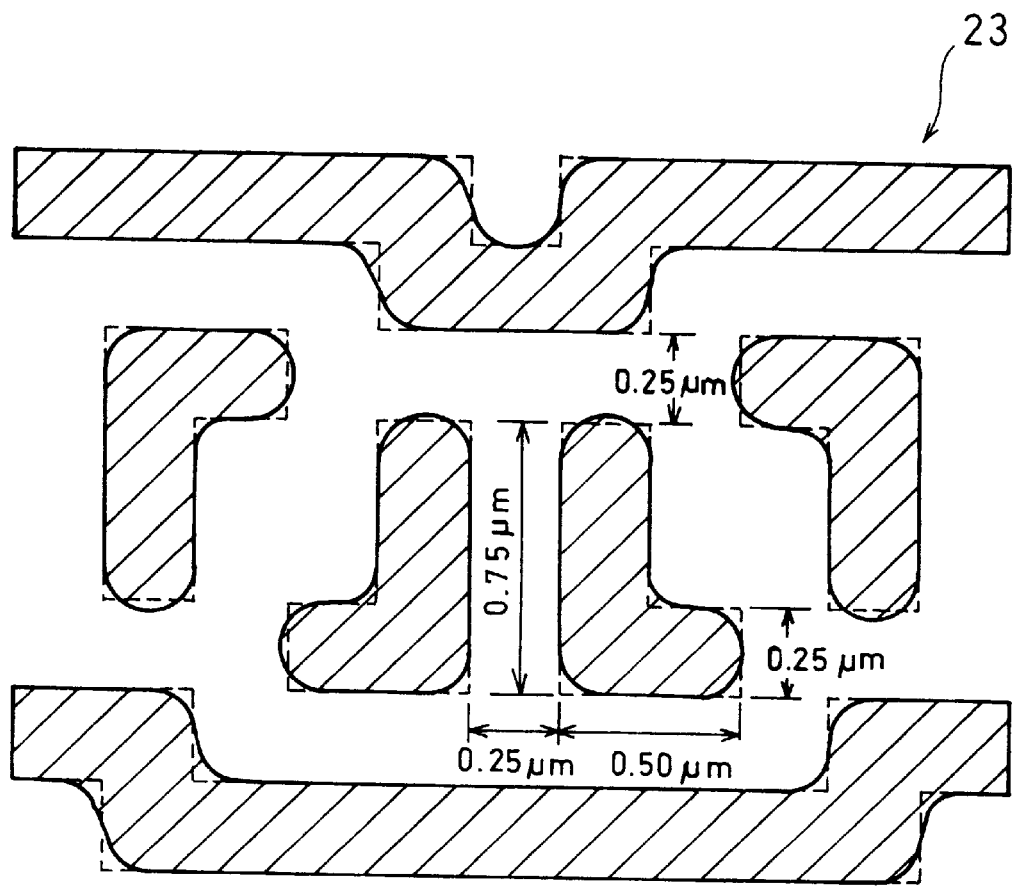
FIG. 12 is a drawing showing a photoresist prepared by using a photomask having the pattern of FIG. 10.
Figure 13:
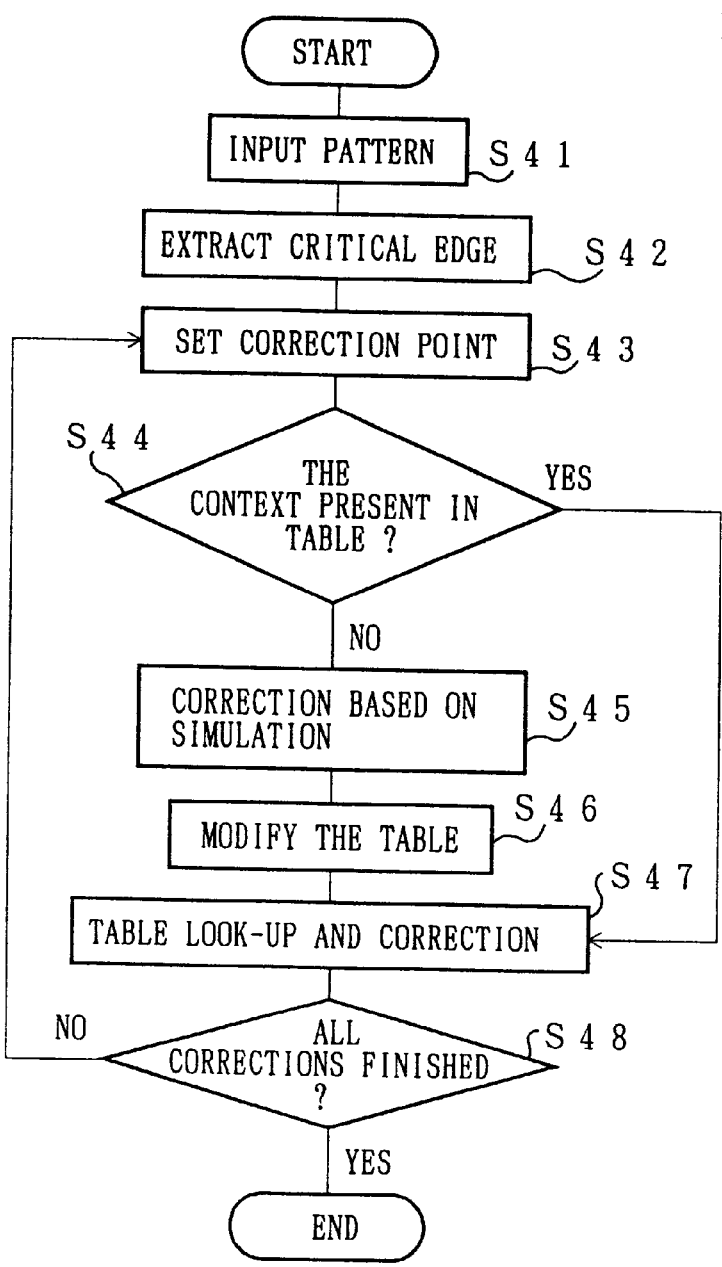
FIG. 13 is a flowchart showing a conventional photomask pattern correcting method.
Figures 14, 15:
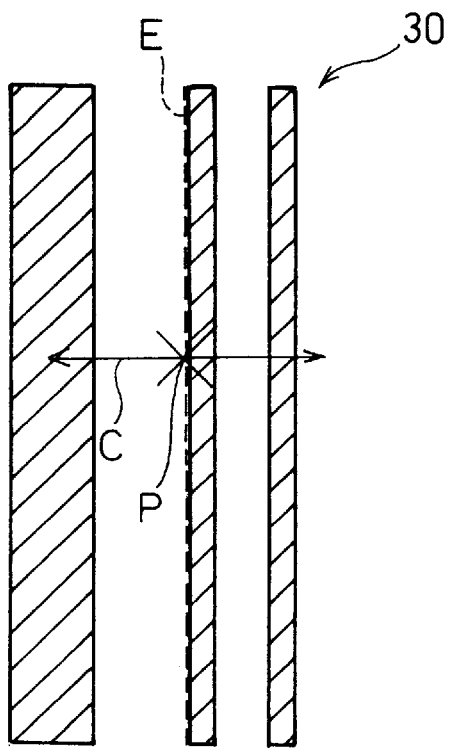
FIG. 14 is an explanatory drawing explaining the conventional photomask pattern correcting method.
FIG. 15 is a drawing showing a correction table used in the conventional pattern correction method.

When the shape of a photoresist which was developed after exposure using the photomask of the pattern 21 of FIG. 10 was measured, a pattern 23 as indicated by the solid lines in FIG. 12 was observed. Note that, in FIG. 12, the broken lines indicates the original pattern 20 of FIG. 7.

As described, in the photomask pattern correcting method of the present invention, it is possible to efficiently and rapidly correct a photomask pattern with respect to all of (1) the optical proximity effect in a photoresist, (2) receding edges and a pattern deformation phenomenon of a photoresist dependent on pattern density and a resist sensitivity characteristic, which occur during development, and (3) the optical proximity effect due to an optical difference in underlayer level, which become problems in a pattern with processed dimensions not more than several times the wavelength of exposing light.

Also, as described above, by extracting in advance a correction range not directly, but indirectly, associated with the proximity effect, it is possible to correct the optical proximity effect in a photomask at a time the line-width of the transparent portion of a photomask in accordance with the value of a projected optical image (simulation) with respect to all the regions. This is important in automatic correction of a photomask pattern having a large area at a chip level or a block level.

With the described arrangement, compared with a conventional arrangement, the proximity effect correction can be significantly simplified so as to allow the operation of photomask pattern correction to be carried out efficiently and integrally. As a result, it is possible to make the automation of the photomask pattern correction technique including the correction of the optical proximity effect easier, and to put the photomask pattern correction technique at a chip level into a practical application.

Note that, the photomask pattern correcting method and the photomask pattern correcting device of the present invention are particularly suitable for forming on a wafer, using a photomask, a fine photoresist pattern not more than several times a wavelength of exposing light by exposure and development.

[Second Embodiment]

The following will describe a second embodiment of the present invention referring to FIG. 16 through FIG. 20.

In the photomask pattern correcting method of the present embodiment, first, data of a layer to be subjected to correction is extracted from data of a plurality of layers included in layout data of a photomask, and a transparent (or opaque) pattern on the layer data is divided into mesh regions of a rectangle or triangle having an area of not more than $(k\lambda/4NA)^2$ so as to carry out a pattern correction on the photomask with respect to each mesh region. It is preferable that the size of the mesh region be substantially $(k\lambda/4NA)^2$ since a mesh region which is too small increases the calculation steps.

Here, k is a parameter called a process constant which is determined by the characteristics of the semiconductor device (exposing device), which usually takes a value of 0.4 to 1.0. $\lambda$ is an exposure wavelength of the exposing device, and NA is the numerical aperture of the exposing device.

Figure 6:
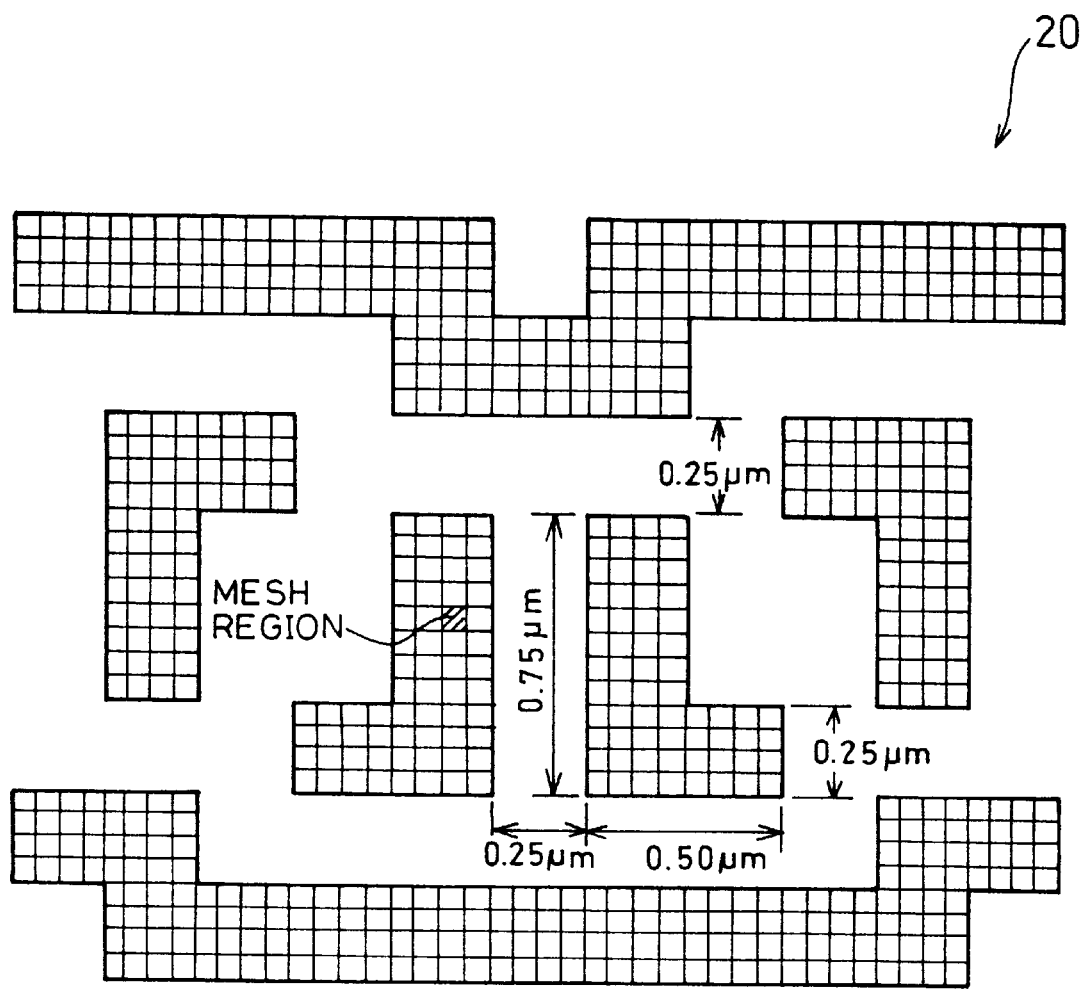
FIG. 6 is a drawing showing how a photomask is divided into mesh regions.

In the method of First Embodiment, as shown in FIG. 6, the range of correction calculation is not specified, and surrounding patterns (adjacent patterns) are divided into mesh regions so as to carry out a correction calculation with respect to all the adjacent surrounding patterns. In contrast, in the method of the present embodiment, the correction calculation is carried out with respect only to the optical proximity effect effective range, but not to a distant pattern.

Namely, in the photomask pattern correction method in accordance with the present embodiment, based on (1) an exposing wavelength $\lambda$, the exposing device, the numerical aperture NA, and a coherent factor $\sigma$, which are optical parameters, and (2) a minimum feature size $\delta$ of a photomask drawing device, a region whose distance from the photomask pattern edge is not more than a predetermined value Leff is designated as the optical proximity effect effective range (region which is affected greatly by the pattern deformation caused by optical proximity effect) so as to carry out a pattern correction for optical proximity effect. Namely, the optical proximity effect correction is carried out with respect only to the optical proximity effect effective range, thus efficiently and accurately correcting the photomask pattern.

Also, the optical proximity effect correction is a correction of a photomask pattern with respect to an exposing image (light intensity distribution) when the photoresist is exposed through the photomask pattern of the LSI. When exposing the photoresist in the Photolithography process, diffraction of light from the transparent portion becomes a problem. In the optical proximity effect correction, the photomask pattern is corrected so as to cancel the effect of diffracted light as much as possible.

The following describes specifically a method for determining the mesh region and the optical proximity effect effective range, using, as an example, a KrF laser exposing device (exposing wavelength=248 nm).

First, the size Sm ($\mu$m) of a mesh region is determined in the following manner. Namely, when NA=0.35 and k=0.7, the size of a mesh region Sm is determined in the following manner:

$$Sm = k\lambda/4NA = 0.7 \times 0.248/(4 \times 0.35) = 0.124$$

Also, when NA=0.4 and k=0.7, the size of a mesh region Sm is determined in the following manner:

$$Sm = k\lambda/4NA = 0.7 \times 0.248/(4 \times 0.4) = 0.108$$

The predetermined value Leff for determining the optical proximity effect effective range is determined by:

$$(a\lambda/NA) + \delta$$

where "a" is a positive coefficient which is determined in accordance with the coherent factor of the exposing device, $\lambda$ is the exposing wavelength of the exposing device, NA is the numerical aperture of the exposing device, and $\delta$ is the minimum feature size of the photomask drawing device.

More specifically, the predetermined value Leff is determined by the following equations:

$$Leff(\lambda, NA, \sigma) = 3\sqrt{2}\lambda/4NA + \delta \qquad (6)$$

when $0.1 \leq \sigma \leq 0.3$;

$$Leff(\lambda, NA, \sigma) = 3\sqrt{2}\lambda/3NA + \delta' \qquad (7)$$

when $0.3 < \sigma < 0.5$; and $$Leff(\lambda, NA, \sigma) = 3\sqrt{2}\lambda/2NA + \delta'' \qquad (8)$$

when $0.5 \leq \sigma$.

For example, when $\sigma=0.2$, NA=0.4, $\delta=0.2$ $\mu$m, and $\lambda=0.248$ $\mu$m, from Equation (6), Leff=0.855.

Note that, an exposing device with $\sigma$ of less than 0.1 is not taken into consideration since such a device does not exist at present, and is unlikely to be realized in the future. Also, in Equations (6) to (8), the optical aberration (spherical aberration) of the exposing device is not considered because it is sufficiently smaller than Leff.

The factors $3\sqrt{2/4}$, $3\sqrt{2/3}$, and $3\sqrt{2/2}$ of Equations (6) to (8), respectively, are determined from data of actual measurement. Also, because the minimum feature size of the photomask drawing device differs depending on the coherent factor (positioning accuracy) $\sigma$, the coherent factors $\delta$, $\delta'$, and $\delta''$ of Equations (6) to (8) have different values, respectively.

The following describes, as a specific example of the optical proximity effect effective range, the optical proximity effect effective range of a photomask pattern of gate electrodes of SRAM (Static Random Access Memory).

Figure 17:
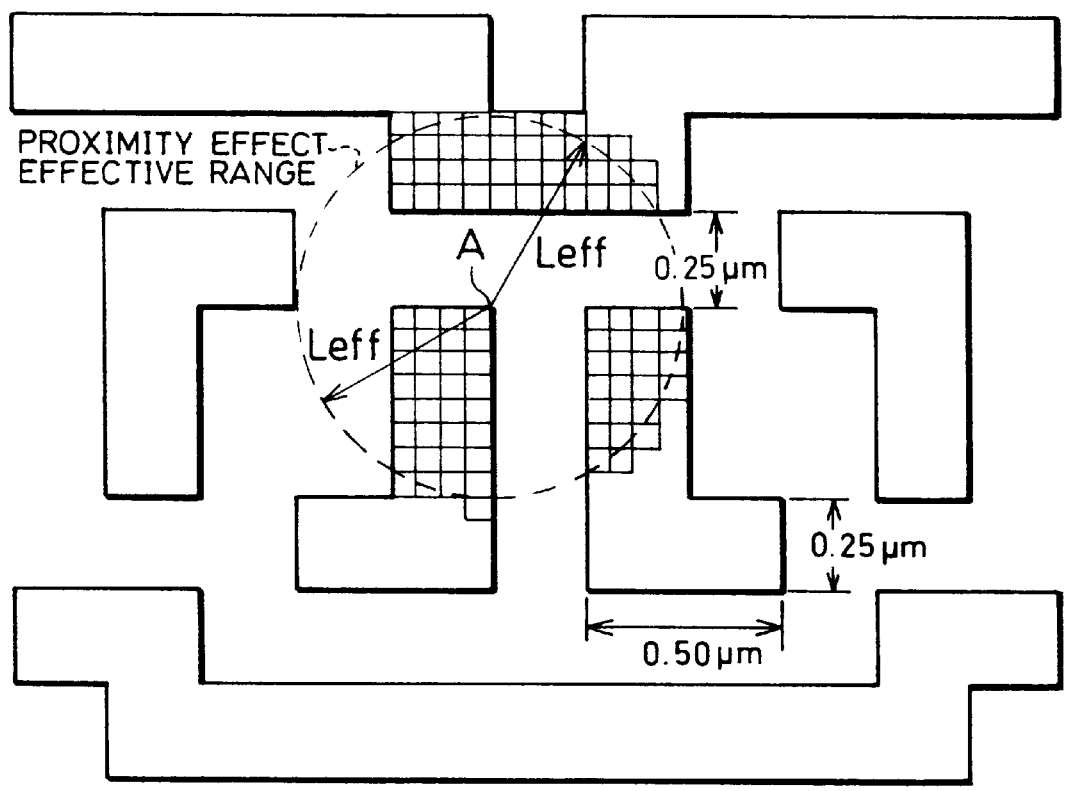
FIG. 17 is a plan view showing a photomask pattern of gate electrodes of an SRAM cell.

Here, assuming that the target mesh region is the region shown in FIG. 17, the estimation for the optical proximity effect effective range with respect to a mesh region A of the pattern edge in this region is carried out in the optical proximity effect effective range as enclosed by the broken circle line in FIG. 17. The optical proximity effect effective range is determined as a range having a radius Leff where the center of the range is the mesh region A on the photomask.

Figure 18:
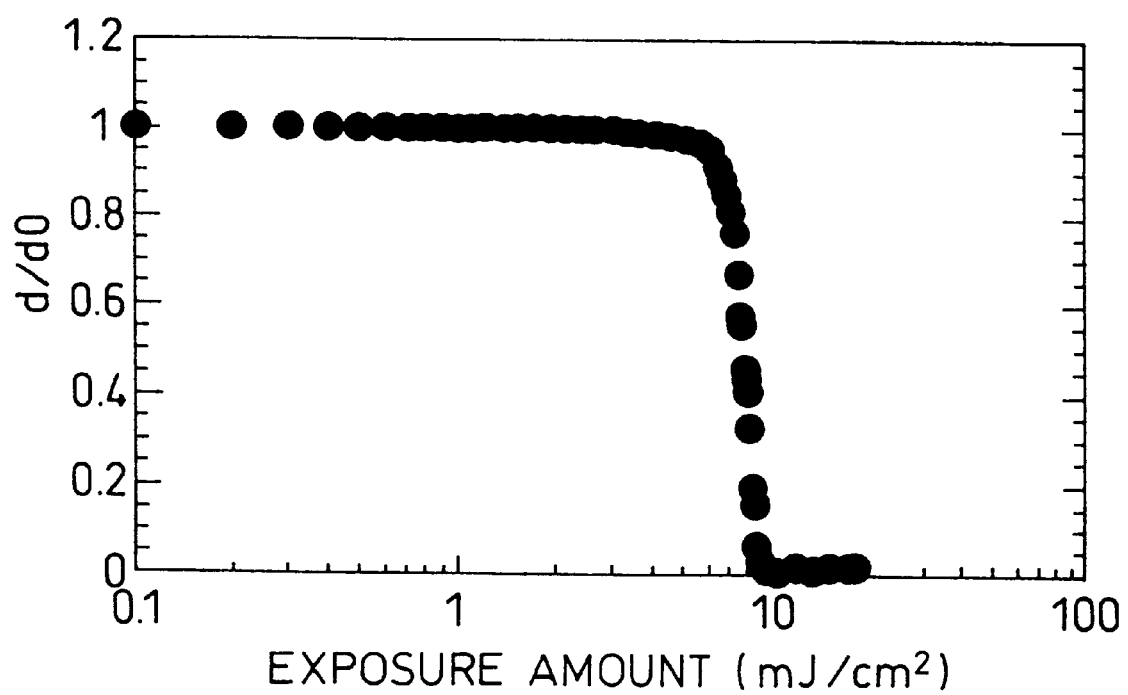
FIG. 18 is a graph showing a sensitivity (exposure amount dependency) characteristic curve of a positive photoresist.

Incidentally, as shown in FIG. 18, in a photoresist whose slope $\gamma$ (slope at the middle of the inclined portion of the sensitivity characteristic curve) representing the exposure amount dependency (photosensitivity characteristic) is steep, the pattern dependency is low. Thus, in such a photoresist, even when adversely affected by other patterns, a pattern shift does not occur, and no problem is presented.

In contrast, in a photoresist having a relatively gradual slope $\gamma$ representing the exposure amount dependency (photosensitivity characteristic), pattern dependency from surrounding patterns is high, and a pattern shift is easily generated during photoresist development. The photoresist starts being exposed with a certain amount of light, and is removed during development when exposure amount is above a certain amount. However, when the slope $\gamma$ is gradual, the photoresist is exposed with only a small amount of light, and the film is reduced. When the exposing amount (energy) is small, the photoresist is not exposed so that the photoresist remains without being developed.

Note that, in FIG. 18, d0 represents a film thickness of a positive photoresist before development, and d represents a film thickness of a positive photoresist after development. Thus, the vertical axis in the graph of FIG. 18 represents a film change in the vertical direction (change in film thickness) of the positive photoresist. Also, in FIG. 18, the rotation speed during application of a photoresist is 3,000 rpm, and the film thickness of the positive photoresist after application of the photoresist is 10,205 Å. Further, although not shown in FIG. 18, on the pattern edge of the positive photoresist, film reduction in the lateral direction, namely, a pattern shift is generated.

As described, since a photoresist whose $\gamma$ value is small is exposed by a small amount of light, a problem is presented in that the pattern shift during development of photoresist becomes larger by more than the proximity effect. In order to overcome such a problem, when the pattern shift during photoresist development is large, in addition to the optical proximity effect correction, correction with respect to the pattern shift during photoresist development, namely, photoresist development correction is also carried out in the optical proximity effect effective range. Note that, the photoresist development correction refers to correction for a photomask pattern with respect to the shape of the photoresist after exposure and development.

In contrast, when the exposure amount dependency of the photoresist is large, namely, when the $\gamma$ value (slope at the middle of the inclined portion of the sensitivity characteristic curve of the photoresist in FIG. 18) representing the sensitivity characteristic of the photoresist is not less than 10, since the threshold model of the exposing amount is well-established, sufficient correction can be carried out only with the optical proximity effect correction based on the optical image without considering the pattern shift during photoresist development. Thus, as shown in FIG. 18, when the exposure dependency of the photoresist is sufficiently large, namely, when the slope γ is steep (large), it is not required to carry out photoresist development correction.

Also, in the case where the γ is gradual and less than 10, the pattern density Eenv is calculated, and it is judged, based on the condition Eenv≧α, whether correction with respect to photoresist development is required. When the slope γ is steep, α becomes larger and Eenv<α, and correction with respect to photoresist development is not required.

Thus, with respect to a region of the pattern satisfying the condition of Eenv≧α, both the optical proximity effect correction and development correction are carried out, and with respect to a region satisfying the condition of Eenv <α, only the optical proximity effect correction is carried out. Because the development correction is carried out with respect only to the region which has been subjected to the optical proximity effect correction, it is ensured that the region which is subjected to the development correction is also subjected to the optical proximity effect correction. Thus, the optical proximity effect is taken into consideration for the pattern shift after development.

The pattern density Eenv around the target mesh region is calculated, for example, by the following Equation (9) or (10):

$$Eenv(x, y) = Ds \sum_{\Omega} \frac{i(x^*, y^*)\Delta(x, y)}{[r(x-x^*, y-y^*)]^2} \quad (9)$$

$$Eenv(x, y) = Ds \sum_{\Omega^i} (x^*, y^*)\Delta(x, y) \text{Erf}(x-x^*, y-y^*) \quad (10)$$

$$\text{Erf}(x-x^*, y-y^*) = \int_r^\infty e^{-t^2} dt$$

Where $$r = \sqrt{(x-x^*)^2 + (y-y^*)^2}$$

Here, i(x*, y*) is a light intensity as specified by simulation of a projected optical image, Ω denotes a region for which the pattern density is calculated, Ds is the exposure amount of the region Ω, Δ(x, y) is an area of an arbitrary transparent portion, r(x-x*, y-y*) is a distance between mesh regions, and Erf denotes an error function.

Of the two Equations (9) and (10), the former is preferable because Equation (9) is more accurate and is more suitable for the present optical proximity effect than Equation (10) which employs the error function which is used generally simply for a statistical purpose.

Incidentally, when the γ value is large, development is carried out with an amount of light which exceeds a certain amount; thus, the shape of the photoresist after development is determined substantially with the threshold value of light intensity. On the other hand, when the γ value is small, the shape of the photoresist after development becomes dependent on the exposure amount and the slope (distribution) of the exposure amount, and a pattern shift is generated. Thus, as the γ value becomes smaller, occurrence of pattern shift during photoresist development is increased.

Unlike the γ value and the pattern density Eenv which are determined by calculation, the threshold value α is determined from experimental data in accordance with the γ value (γ value of the slope of the curve in FIG. 18) representing the exposure sensitivity of the photoresist. Namely, with respect to each processing condition (types of photoresist, baking temperature, developing time, etc.), the pattern density Eenv is varied, and a minimum pattern density Eenv for which correction is required, as the pattern shift during development is made larger by receding of line edges, is given the α value.

Figure 16:
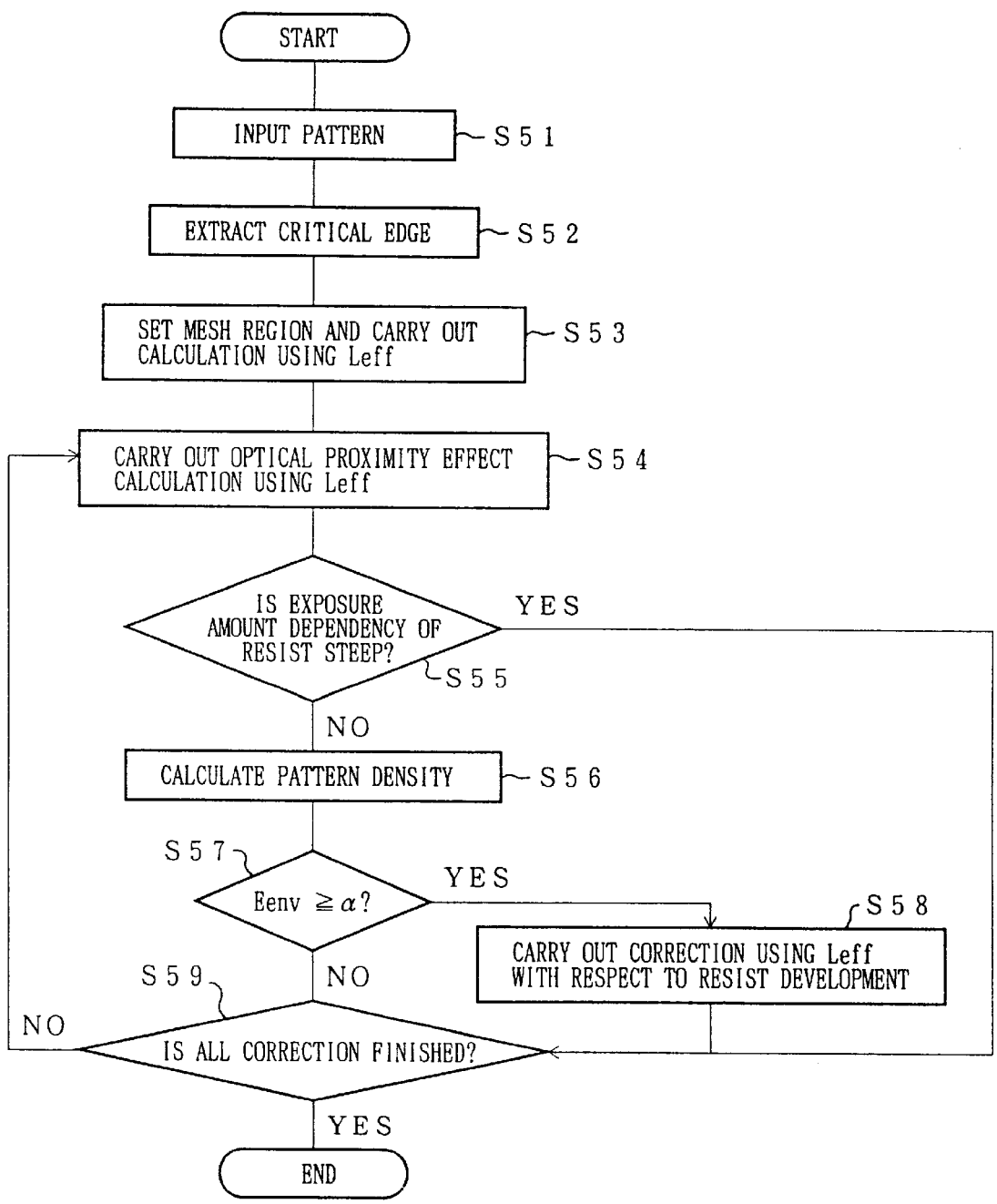
FIG. 16 is a flowchart showing another photomask pattern correcting method in accordance with the present invention.

The following will describe in detail a photomask pattern correction method in accordance with the present embodiment referring to the flowchart of FIG. 16.

First, photomask pattern data (for example, layout data) used in the manufacturing process on the semiconductor device are inputted into the pattern correction device with respect to data of each layer (S51).

Secondly, the photomask pattern data are sent to the optical proximity effect correcting section of the pattern correction device. In the optical proximity effect correcting section, the critical edge is extracted (S52). The critical edge is a region which requires pattern correction, for example, a region requiring correction of a line-width (or space) as a result of a change in pattern density, and an edge of a fine line or outer side of the corner where receding is expected for which supplement pattern such as serif is required. Serif is a bumpy supplement pattern provided so as to project from the corner of a dyne pattern (opaque portion if the photoresist is positive type).

Thirdly, the extracted critical edge on the layout pattern is divided using the optical proximity effect effective range as a reference, and a mesh region for calculation is set per optical proximity effect effective range (S53).

Fourthly, with respect to one of the critical corners (critical edges) on the photomask pattern, a degree to which the corner is affected by surrounding patterns is calculated in a region with a radius Leff, of which the center is the critical corner. Also, in a region with a radius Leff (optical proximity effect effective range), of which the center is another corner or an adjacent mesh region (adjacent side or adjacent corner), a degree to which the corner is affected by surrounding patterns is calculated. In this manner, with respect to each critical corner on the photomask pattern, the effect of the surrounding patterns is calculated one after another. Also, in S53, calculation of Leff and setting of the optical proximity effect effective range are carried out before or after setting the mesh region.

Fifthly, optical proximity effect correction calculation is carried out (S54). Namely, using the optical proximity effect effective range as a reference, an optical image of the photomask pattern is calculated using the mesh region which has been set in S53, and pattern correction is carried out in a region of which an error with respect to the target pattern is large.

Note that, the optical image of the photomask pattern is an aerial image in the case where the photoresist is not present, or a latent image in the case where the photoresist is present considering the refractive index and absorptivity which are the properties of the photoresist.

Sixth, the sensitivity characteristic of the photoresist is judged (S55). Namely, based on the sensitivity characteristic of the photoresist under predetermined photolithography processing conditions, exposure amount dependency of the photoresist is evaluated, and when the γ value is sufficiently large, not less than 10, the sequence goes to S59, and when the γ value is less than 10, the sequence goes to S56.

Seventh, with respect to a position where the optical proximity effect is to be evaluated, based on Equations (9) and (10), surrounding pattern density is calculated in the optical proximity effect effective range. (S56).

Eighth, based on the surrounding pattern density obtained from the pattern density calculation, it is judged whether the development correction is required in the process (S57). For example, when the process is a positive photoresist process such as a positive chemical amplified photoresist process, the development correction is carried out with respect to a region with a pattern density Eenv of not less than a predetermined value α. On the other hand, when the pattern density Eenv is less than α, the sequence goes to S59. Note that, the chemical amplified photoresist is a photoresist which generates acid upon exposure and reacts with the acid thus generated.

Ninth, pattern correction (photoresist development correction) considering the line-width shift amount during photoresist development is carried out (S58), and the sequence goes to S59.

Tenth, a correction finishing judgment is carried out (S59). Namely, it is judged whether correction has been carried out with respect to all of the critical portions in the pattern on the entire photomask, i.e., with respect to all the extracted critical edges which have been extracted in S52. When there is a critical edge which has not been corrected, the sequence returns S54. When the sequence returns to S54 from S59, the optical proximity effect correction in S54 is carried out by using the same Leff which has been used in the previous round. Finally, pattern correction is carried out with respect to all the critical edges which have been extracted in S52, and the process is finished.

Figure 19:
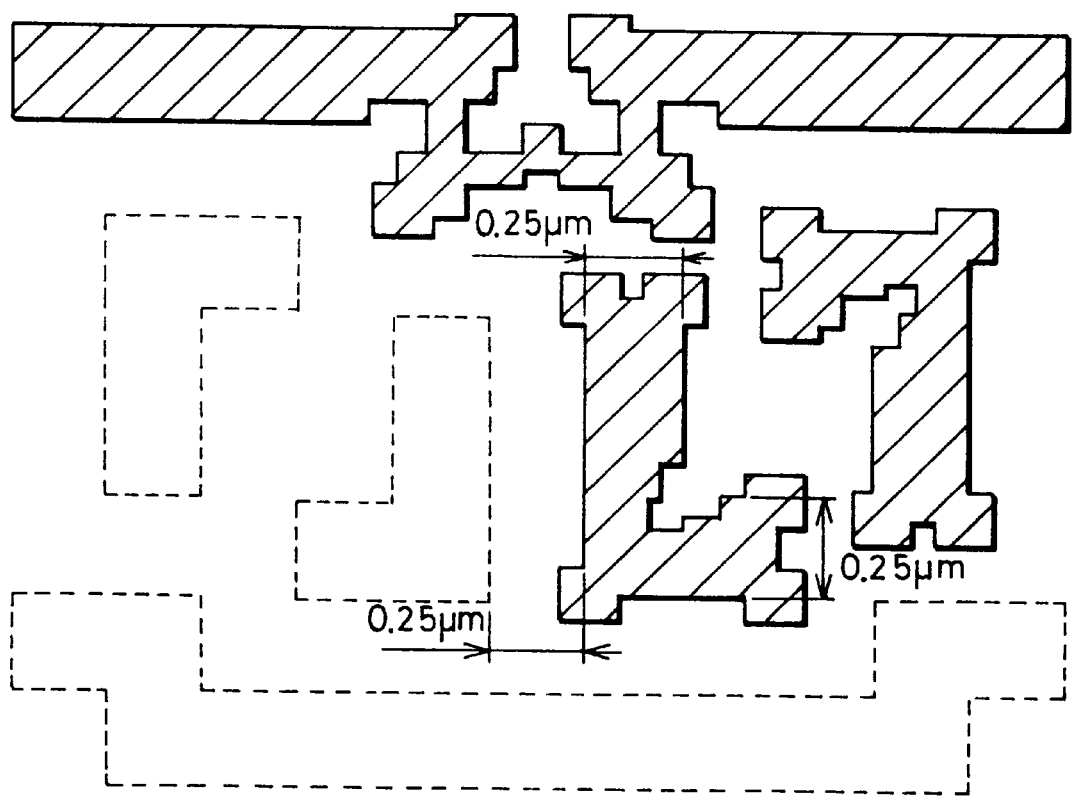
FIG. 19 is a plan view showing a photomask pattern which has been corrected by the photomask pattern correcting method in accordance with the present invention.

By the described method, the photomask pattern is corrected, for example, to the pattern shown in FIG. 19.

Figure 20:
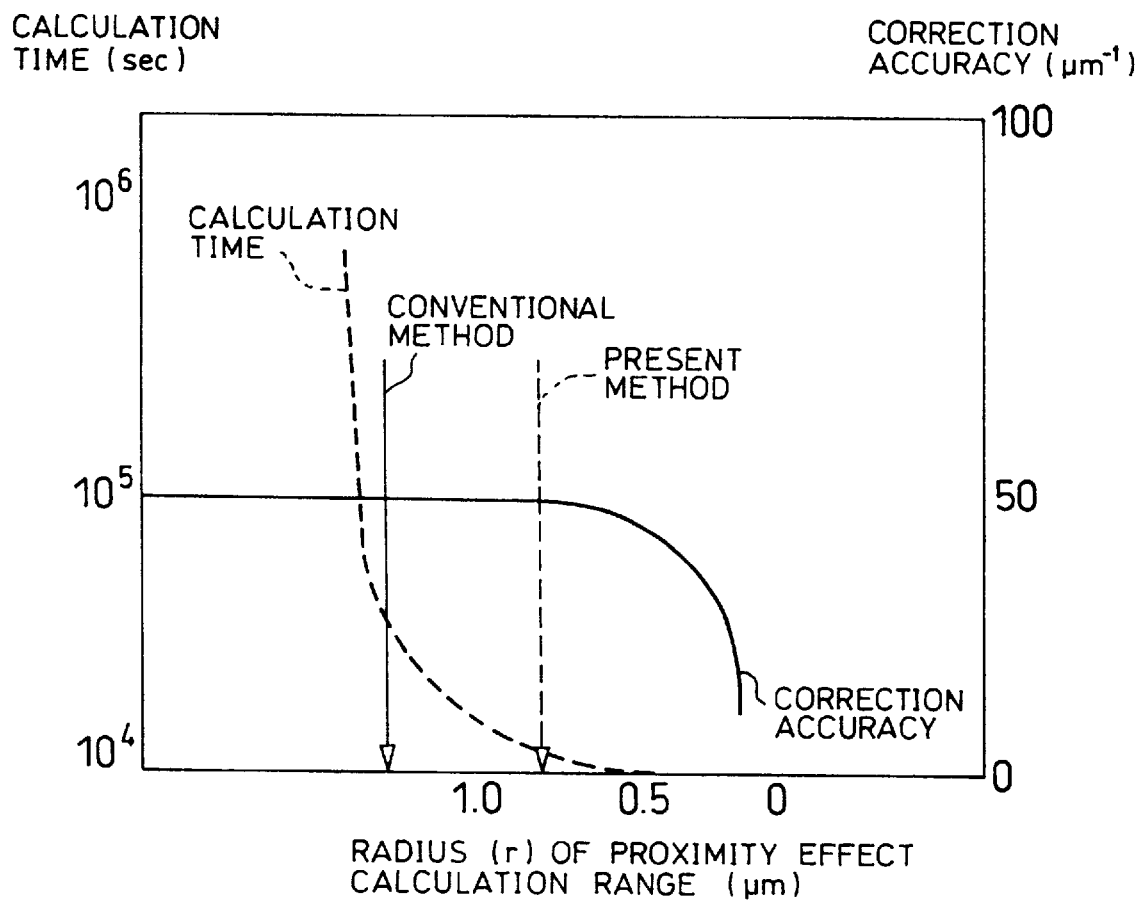
FIG. 20 is a graph of a radius of an optical proximity effect calculation range versus correction accuracy and calculation time, in the method of a second embodiment and a conventional method.

FIG. 20 shows the results of a comparison between the method of the present embodiment and the conventional method, which was made with respect to the radius r (μm) of the optical proximity effect effective range (calculation range) during development against a change in correction accuracy (calculation accuracy) and calculation time. From FIG. 20, it can be seen that in the method of the present embodiment using Leff, compared with the conventional method which does not use Leff, the calculation time is greatly reduced.

As described, in the photomask pattern correction method of the present embodiment, the optical proximity effect effective range is set using Leff, and the photomask pattern is corrected based on simulation and measured data, and the surrounding pattern density is calculated so as to extract a pattern shift region during development. This significantly reduces the number of optical proximity effect correction steps which had been required conventionally, and allows the photomask pattern correction to be carried out efficiently and accurately.

[Third Embodiment]

Figure 21:
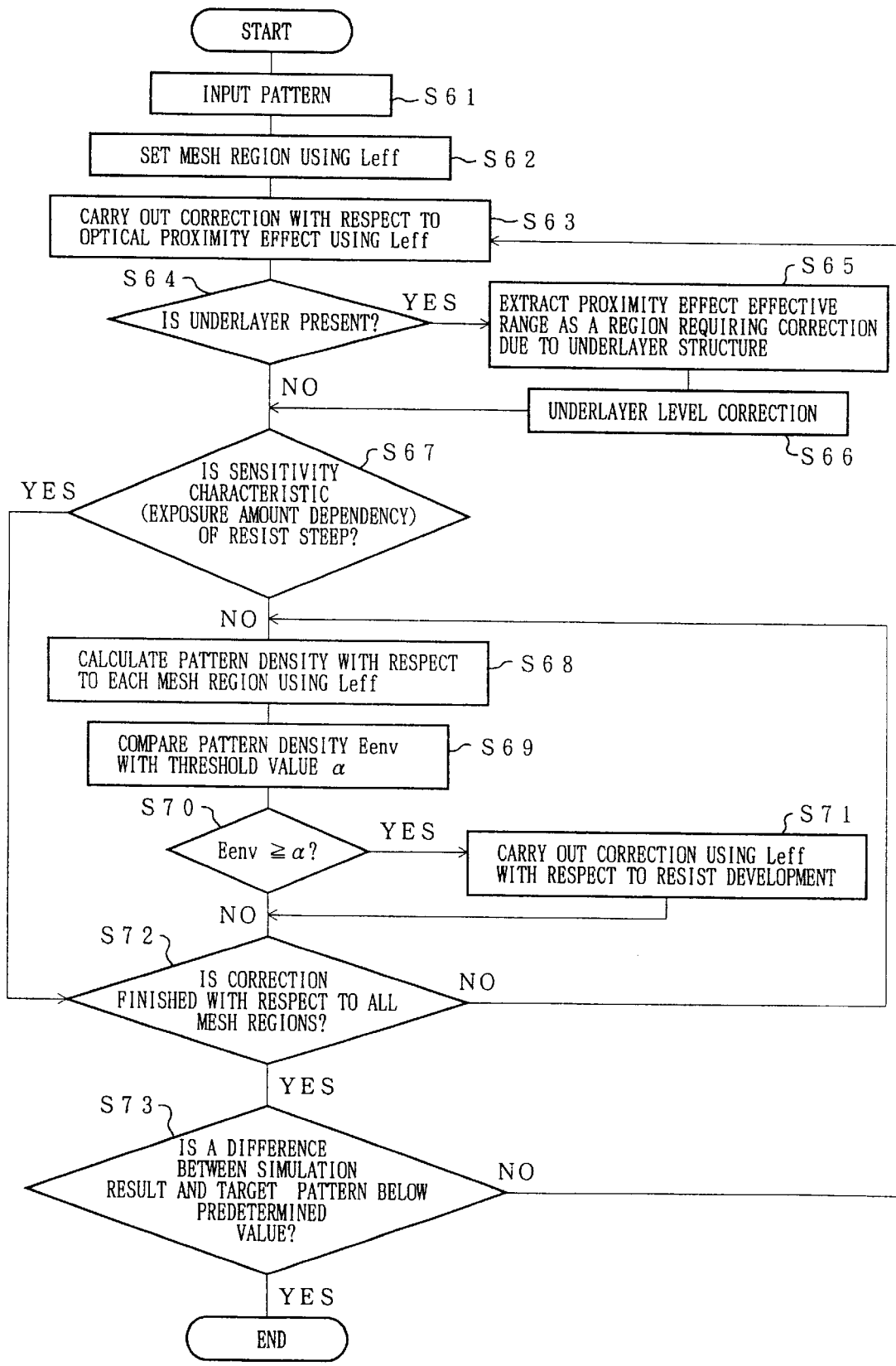
FIG. 21 is a flowchart showing yet another photomask pattern correcting method in accordance with the present invention.

The following describes a third embodiment of the present invention referring to FIG. 21.

In the photomask pattern correction method in accordance with the present embodiment, as shown in FIG. 21, after pattern data have been inputted in the same manner as in S51 of FIG. 16 (S61), a mesh region is set using Leff having a predetermined value with respect, not to the entire photomask, but to a region which is likely to present a problem (pattern edge or a region with a high density pattern) (S62).

Then, as in S54, correction is carried out using Leff having a predetermined value with respect to the optical proximity effect (S63). Also, as in S3, presence or absence of an underlayer level is judged (S64). When an underlayer level is not present, the sequence goes to S67. When an underlayer level is present, as in S4, the optical proximity effect effective range is extracted as a range requiring correction due to the difference in underlayer level (S65), and after carrying out the underlayer level correction as in S5 (S66), the sequence goes to S67.

Since S67 to S71 are the same as S54 to S58, explanations thereof are omitted. After S67 to S71, as in S11, it is judged in S72 whether correction for all the mesh region has been finished. When it is judged in S11 that the correction has been finished with respect to all the mesh regions, as in S12, it is judged in S73 whether a difference between the simulation result and the target pattern is below a predetermined value. When the difference is not below the predetermined value, the sequence returns to S63, and when the difference is below the predetermined value, the correction is finished.

As described, in the photomask pattern correcting method in accordance with the present embodiment, because the underlayer level correction is carried out with respect to the proximity effect effective range in addition to the method of the second embodiment, it is possible to more accurately correct the pattern shift of the photomask pattern.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for correcting a pattern of a photomask for forming a desired photoresist pattern on a wafer by exposing a photoresist by an exposing device through a photomask which has been made by a photomask drawing device, the method comprising:

determining a predetermined value based on exposure wavelength, numerical aperture, and coherent factor of the exposing device and based on a minimum feature size of the photomask drawing device;

designating a region whose distance from an edge of the photomask is not more than the predetermined value as an optical proximity effect effective range; and carrying out correction with respect only to the optical proximity effect effective range.

2. The method as set forth in claim 1, wherein transparent pattern density is determined in said optical proximity effect effective range so as to carry out correction for a pattern shift during photoresist development with respect only to a region whose transparent pattern density is not less than a threshold value.

3. The method as set forth in claim 2, wherein the threshold value is determined from a γ value representing exposure sensitivity of a photoresist.

4. The method as set forth in claim 1, wherein the predetermined value is determined by (aλ/NA)+δ, "a" being a positive coefficient which is determined in accordance with the coherent factor of the exposing device, λ being the exposure wavelength of the exposing device, NA being the numerical aperture of the exposing device, and δ being the minimum feature size of the photomask drawing device.

5. A photomask which is pattern-corrected by the method of claim 1.

6. The method as set forth in claim 1, including the steps of:

judging whether to carry out correction with respect to an optical proximity effect due to a base structure of the photoresist over the optical proximity effect effective range; and correcting the optical proximity effect effective range based on the judgment.

7. A method for correcting a photomask pattern for processing a photomask used for patterning a photoresist, the method comprising:

determining a predetermined value based on exposure wavelength, numerical aperture, and coherent factor of an exposing device used to expose the photoresist, and based on a minimum feature size of the photomask drawing device;

designating a region whose distance from an edge of the photomask pattern is not more than the predetermined value as an optical proximity effect effective range of the photomask pattern; and carrying out pattern correction with respect only to the optical proximity effect effective range.

8. The method as set forth in claim 7, wherein transparent pattern density is determined in said optical proximity effect effective range so as to carry out correction for a pattern shift during photoresist development with respect only to a region whose transparent pattern density is not less than a threshold value.

9. The method as set forth in claim 8, wherein the threshold value is determined from a $\gamma$ value representing exposure sensitivity of a photoresist.

10. The method as set forth in claim 7, wherein the predetermined value is determined by $(a\lambda/NA)+\delta$, "a" being a positive coefficient which is determined in accordance with the coherent factor of the exposing device, $\lambda$ being the exposure wavelength of the exposing device, NA being the numerical aperture of the exposing device, and $\delta$ being the minimum feature size of the photomask drawing device.

11. A photomask which is pattern-corrected by the method of claim 7.

* * * * *